(12) United States Patent
Madawala et al.

(10) Patent No.: US 12,355,272 B2
(45) Date of Patent: Jul. 8, 2025

(54) INDUCTIVE POWER TRANSFER SYSTEM CONTROL

(71) Applicant: Auckland Uniservices Limited, Auckland (NZ)

(72) Inventors: Udaya Kumara Madawala, Auckland (NZ); Yeran Liu, Auckland (NZ)

(73) Assignee: Auckland UniServices Limited, Auckland (NZ)

( * ) Notice: Subject to any disclaimer, the term of this patent is extended or adjusted under 35 U.S.C. 154(b) by 394 days.

(21) Appl. No.: 17/639,426

(22) PCT Filed: Sep. 3, 2020

(86) PCT No.: PCT/IB2020/058224
§ 371 (c)(1),
(2) Date: Mar. 1, 2022

(87) PCT Pub. No.: WO2021/044348
PCT Pub. Date: Mar. 11, 2021

(65) Prior Publication Data
US 2022/0337092 A1    Oct. 20, 2022

(30) Foreign Application Priority Data

Sep. 3, 2019 (NZ) .................... 756956
Sep. 5, 2019 (NZ) .................... 757010

(51) Int. Cl.
*H02J 50/80* (2016.01)
*H02J 7/00* (2006.01)
(Continued)

(52) U.S. Cl.
CPC .......... *H02J 50/80* (2016.02); *H02J 7/00712* (2020.01); *H02J 50/12* (2016.02); *H02M 1/0058* (2021.05);
(Continued)

(58) Field of Classification Search
CPC ........ H02J 50/12; H02J 7/00712; H02J 50/80; H02J 2310/48; H02M 1/0058; H02M 3/33584; B60L 53/122; H04B 5/79
See application file for complete search history.

(56) References Cited

U.S. PATENT DOCUMENTS 10,833,638 B2 * 11/2020 Govindaraj ........... H02J 7/0071
2017/0018974 A1     1/2017 Madawala et al.
(Continued)

FOREIGN PATENT DOCUMENTS

CN    104702113 A    6/2015
CN    109728633 A    5/2019
(Continued)

OTHER PUBLICATIONS

International Search Report and Written Opinion in counterpart International Application No. PCT/US2020/058224, mailed Nov. 6, 2020, 14 pages.
(Continued)

*Primary Examiner* — Daniel Cavallari
(74) *Attorney, Agent, or Firm* — Edell, Shapiro & Finnan, LLC

(57) ABSTRACT

A method of controlling the primary or secondary side converter of a wireless power transfer (WPT) or an inductive power transfer (IPT) system includes optimising a load impedance, and controlling one or more of a duty cycle or relative phase angle to reduce or minimize the converter losses at the optimal load impedance

21 Claims, 15 Drawing Sheets

(51) Int. Cl.
  *H02J 50/12* (2016.01)
  *H02M 1/00* (2006.01)
  *B60L 53/122* (2019.01)
  *H02M 3/335* (2006.01)
  *H04B 5/79* (2024.01)

(52) U.S. Cl.
  CPC ......... *B60L 53/122* (2019.02); *H02J 2310/48* (2020.01); *H02M 3/33584* (2013.01); *H04B 5/79* (2024.01)

(56) References Cited

U.S. PATENT DOCUMENTS

2017/0149285 A1 5/2017 Ushijima et al.
2017/0222488 A1 8/2017 Madawala et al.
2019/0267841 A1 8/2019 Richter

FOREIGN PATENT DOCUMENTS

CN 109823206 A 5/2019
EP 2899847 A1 7/2015

OTHER PUBLICATIONS

Extended European Search Report in counterpart European Application No. 20860565.9-1012, mailed Aug. 14, 2023, 4 pages.
Vermeer Wiljan et al: "Design of Misalignment Tolerant Control for an Inductive Charger with V2G Possibilities", 2019 IEEE Pels Workshop on Emerging Technologies: Wireless Power Transfer (WOW), IEEE, Jun. 18, 2019 (Jun. 18, 2019), pp. 273-278, XP033738642, DOI: 10.1109/WOW45936.2019.9030618 [retrieved on Mar. 9, 2020].

* cited by examiner

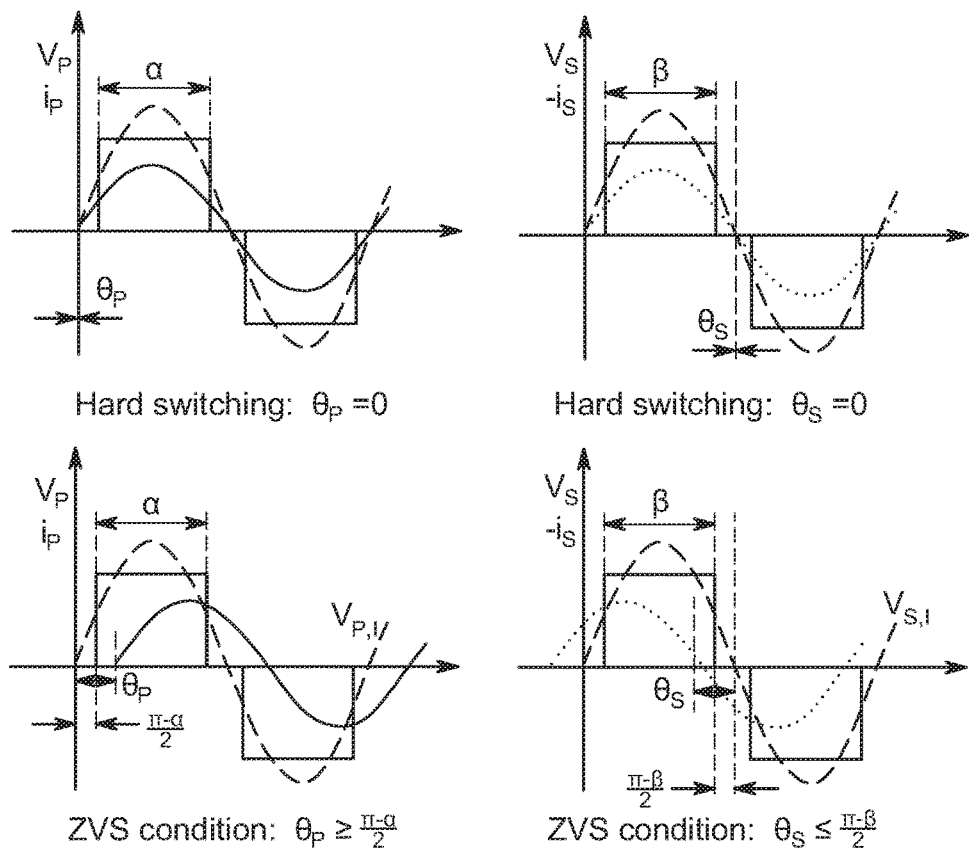
FIG. 3A
FIG. 3B
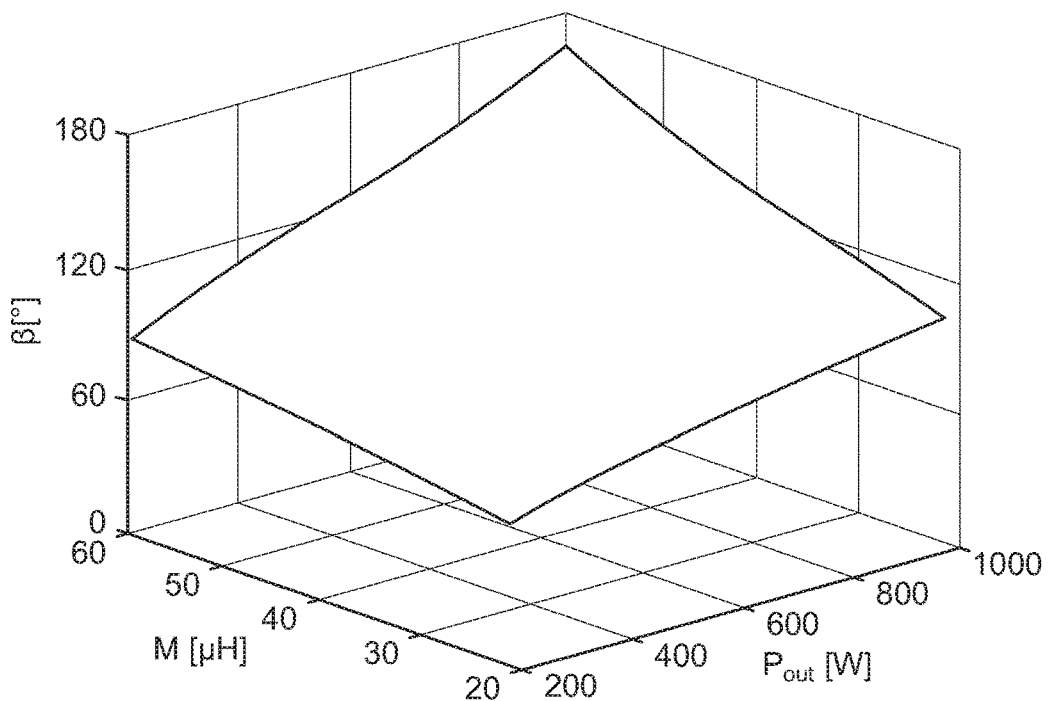
FIG. 4

INDUCTIVE POWER TRANSFER SYSTEM CONTROL

FIELD

The present invention relates to an inductive power transfer (IPT) apparatus (which is also referred to as wireless power transfer (WPT) apparatus), and to a method of controlling an IPT apparatus, and further to a primary IPT power supplies or pads.

BACKGROUND

IPT has become a safe, efficient and economic technology.

One important application of IPT systems is charging electric vehicles (EVs). EVs are now globally accepted as the means of future transport that addresses energy and emission concerns. EVs can be charged using either a wired or wireless power transfer (WPT) technology. Wired charging is the most common way of charging EVs but long charging cables pose trip hazards, and it is not ideal for in harsh and hostile conditions where there are snow, ice and chemicals. In contrast, wireless EV charging, based on inductive power transfer (IPT) technology, is gaining recognition as a convenient way to charge EVs through weak magnetic coupling between a coil on each of the primary and secondary sides of the system with no physical connections. WPT enables power transfer across an air-gap, and is safe and convenient and, hence, becoming popular in EV charging applications. EVs can be charged wirelessly when the vehicle is either stationary or moving (dynamic). Irrespective of whether the EV is stationary or moving, one of the main challenges in wireless EV charging is to mitigate the adverse effects caused by the misalignment between the primary and secondary coils.

Coil misalignment between the primary and secondary sides of a WPT system is an unavoidable challenge in wireless power transfer systems. Both self- and mutual inductances inevitably vary with coil misalignment. As a result, not only is the output power significantly affected, but also the WPT system operates under a de-tuned condition, drawing reactive power and thereby increasing losses.

A number of control concepts have been proposed to address this problem but with varying degrees of success. There is at present no control strategy or system for WPT systems that can regulate power with optimal efficiency, while also providing zero voltage switching (ZVS) for electronic switches that are used in converters, for significant coil misalignments and load variations.

While the invention will be described in the context of EV applications and bidirectional WPT systems, it is not limited thereto. In particular, the invention can be used in low power applications as well, e.g. for charging of cell phone batteries.

BRIEF SUMMARY OF THE INVENTION

In one aspect the disclosure provides a method of controlling an inductive power transfer (IPT) primary or secondary converter, the method comprising the steps of:
controlling an operating frequency to optimise a load impedance (or resistance), and;
controlling one or more of a duty cycle or relative phase angle to reduce or minimize the converter losses at the optimal load impedance.

In another aspect the disclosure provides a method of controlling an inductive power transfer (IPT) primary converter of an IPT system primary side for coupling with an IPT system secondary side having a secondary converter, the method comprising the steps of:
determining that the secondary side converter is operating at a required operating condition; controlling the frequency of the primary converter to minimise the reactance of the secondary side;
controlling the duty cycle of the primary side converter to regulate the power output of the secondary side.

Preferably the required operating condition includes zero voltage switching (ZVS).

Preferably the required operating condition is a required efficiency load condition. Most preferably the required operating condition is an optimal efficiency load condition.

Alternatively the required operating condition is determined by a secondary side power output.

Preferably the optimal efficiency load condition is achieved when the total reactance of the secondary side is minimised, most preferably zero.

Preferably ZVS comprises a switching device or devices of the secondary converter switching at substantially zero voltage across the or each switching device.

Preferably ZVS is controlled by controlling the relative phase angle of the secondary converter. The relative phase angle comprises the phase angle between the AC voltage and current of the secondary converter.

Preferably controlling the relative phase angle of the secondary converter controls the relative phase angle between the AC voltages produced by the primary and secondary side converters. Accordingly, control of the relative phase angle of the secondary converter indirectly controls the relative phase angle between the voltages of the primary and secondary converters Preferably the relative phase angle between the AC voltage and current of the secondary converter is controlled dependent on the duty cycle of the secondary converter. Most preferably the relative phase angle between the AC voltage and current of the secondary converter is controlled according to equation (15).

Preferably the frequency of the primary converter is controlled to make the total reactance of the secondary side system zero.

Preferably the output power of the secondary side is compared to a required output power to provide an error signal and the duty cycle of the primary side converter is controlled to minimise the error.

Preferably the output reactive power of the secondary side is compared to a input reactive power to provide an error signal and the duty cycle of the primary side converter is controlled to minimise the error.

In another aspect the disclosure provides a method of controlling an inductive power transfer (IPT) secondary converter of an IPT system secondary side for coupling with an IPT system primary side having a primary converter, the method comprising the steps of:
adjusting the duty cycle of the secondary side converter to a required operating condition;
controlling the relative phase angle between the AC voltage and current of the secondary side converter such that the secondary side converter operates at zero voltage switching (ZVS).

Preferably the required operating condition is a required efficiency load condition. Most preferably the required operating condition is an optimal efficiency load condition.

Alternatively the required operating condition is determined by a secondary side power output.

Preferably the optimal efficiency load condition is achieved when the total reactance of the secondary side is minimised, most preferably zero.

Preferably ZVS is controlled by controlling the relative phase angle between the AC voltage and current of the secondary converter.

Preferably the relative phase angle between the AC voltage and current of the secondary side converter is controlled dependent on the duty cycle of the secondary side converter. Most preferably the relative phase angle between the AC voltage and current of the secondary side converter is controlled according to equation (15).

Preferably the frequency of the primary converter is controlled to minimise the total reactance of the secondary side system. Preferably the frequency of the primary converter is controlled to make the total reactance of the secondary side system zero.

Preferably the output power of the secondary side is compared to a required output power to provide an error signal and the duty cycle of the primary side converter is controlled to minimise the error.

Preferably the output reactive power of the secondary side is compared to input reactive power to provide an error signal and the duty cycle of the primary side converter is controlled to minimise the error.

In another aspect the disclosure provides a method of controlling inductive power transfer (IPT) system having a primary converter of a primary side for coupling with a secondary side having a secondary converter, the method comprising the steps of:
  adjusting the duty cycle of the secondary side converter to a required operating condition; controlling the relative phase angle between the AC voltage and current of the secondary side converter such that the secondary side converter operates at zero voltage switching (ZVS).

Preferably the duty cycle of the secondary side converter is adjusted to control the output power.

Preferably the duty cycle of the secondary side converter is communicated to the primary side.

Preferably the output reactive power on the secondary side is communicated to the primary side.

Preferably the duty cycle of the primary side converter is controlled to be greater than the duty cycle of the secondary side converter. Most preferably the primary side converter is controlled to be equal to the duty cycle of the secondary side converter plus a correction factor.

Preferably the relative phase angle between the AC voltage and current of the primary side converter is determined. Preferably the frequency of the primary converter is controlled to provide ZVS.

In another aspect the disclosure provides a method of controlling inductive power transfer (IPT) system having a primary converter of a primary side for coupling with a secondary side having a secondary converter, the method comprising the steps of:
  adjusting the duty cycle of the secondary side converter to a required operating point;
  controlling the relative phase angle between the AC voltage and current of the secondary side converter such that the secondary side converter operates at zero voltage switching (ZVS).

Preferably the duty cycle of the primary side converter is set to an initial value. Preferably the initial value is pi.

Preferably the total primary side impedance is determined and used to estimate mutual inductance between the primary and secondary sides and output power.

Preferably the duty cycle of the primary and the frequency are adjusted to achieve a required operating condition. Preferably the required operating condition is an optimal operating condition.

In another aspect the disclosure provides a control means or controller operable to perform any of the methods disclosed herein.

In another aspect the disclosure provides an IPT system, or an IPT system primary apparatus or secondary apparatus operable to perform any of the methods disclosed herein.

Further aspects will become apparent from the following description.

BRIEF DESCRIPTION OF THE FIGURES

FIGS. 3A and 3B are waveforms showing voltage and current phase relationships, where FIG. 3A illustrates the primary side, and FIG. 3B the secondary side.

FIG. 4 is a graph of β with respect to M and $P_{out}$.

This specification discloses a comprehensive control strategy for IPT systems to regulate power at an optimal efficiency condition while operating converters with ZVS for coil misalignments, particularly at significant coil misalignments, and wide load range. The variations of both self and mutual inductance caused by the coil misalignment are considered. Four control freedoms, including the duty-cycles of the primary and secondary side converters, the relative phase angle between the AC voltage and current of the secondary converter, and the operating frequency are utilized to achieve or substantially achieve four control goals:
1) the regulated power;
2) the optimal equivalent load resistance;
3) zero secondary reactance;
4) ZVS conditions for primary and secondary converters.

A comprehensive circuit model is disclosed, describing the optimal operation conditions of the fundamental harmonic circuit and dual-side converters, the selection of optimal operating frequency, and the symmetrical characteristics of the disclosed control methods. The control methods and systems disclosed herein are applicable to both unidirectional and BD IPT systems and is validated by theoretical analysis and experiments results in a 1 kW BD-IPT prototype, in comparison with known control methods.

Figure 1A:
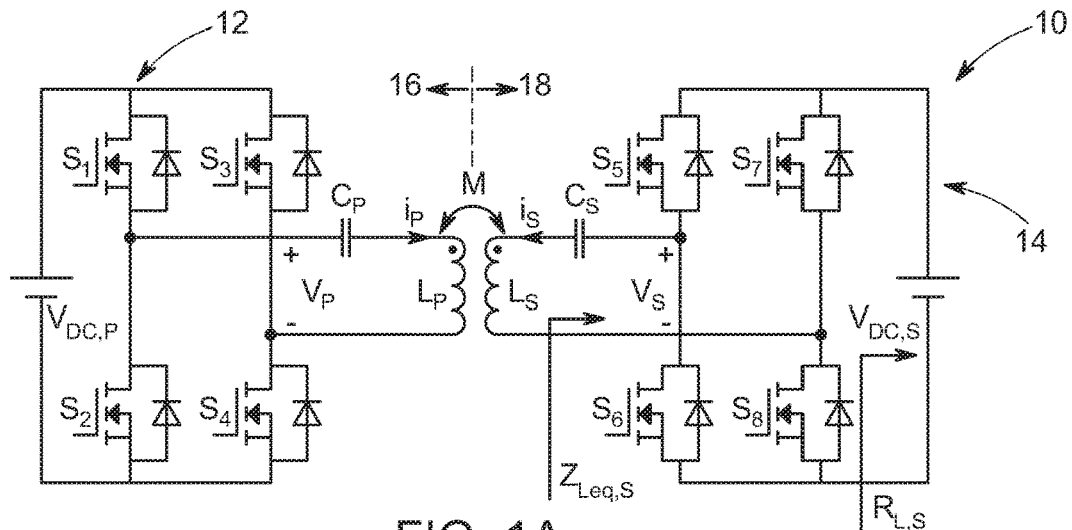
FIG. 1 is (a) a simplified circuit schematic for a bidirectional IPT system; (b) a fundamental harmonic circuit model for a) based on load impedance; c) a fundamental harmonic circuit model for a) based on equivalent voltage source.
Figure 1B:
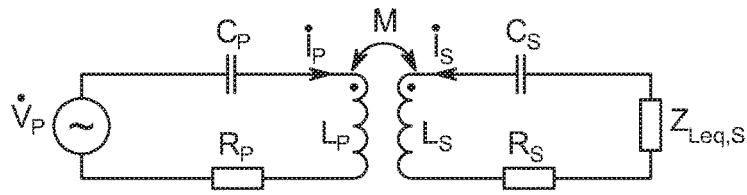
Figure 1C:
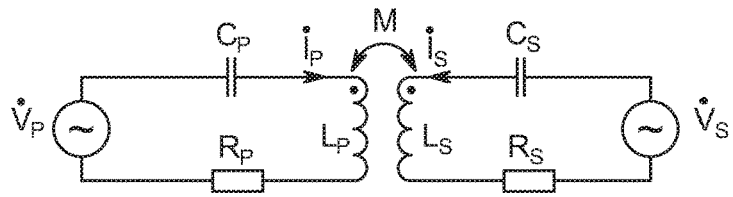
Figure 2:
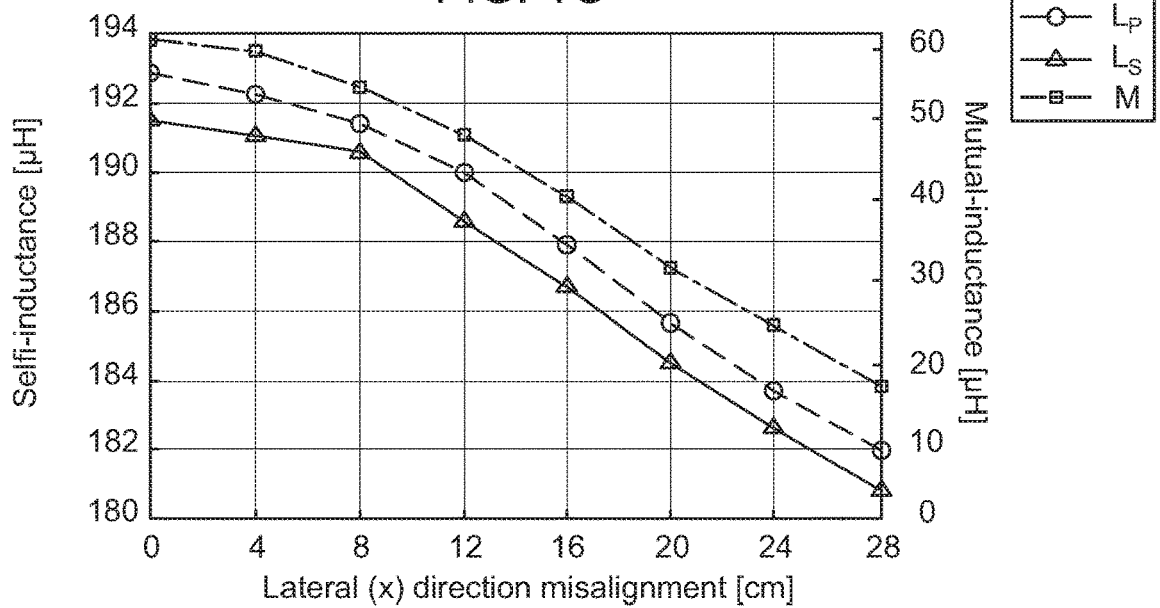
FIG. 2 is a graph showing variations is self and mutual inductance with coil misalignment.

A series-series (S-S) resonant network is chosen as the compensation topology for the purposes of explanation. The principles described below are applicable to other resonant compensation networks, for example parallel tuned networks. A schematic of a typical S-S compensated bi-directional IPT system is shown in FIG. 1 (a), generally referenced 10. The system 10 comprises a primary side 16 having a primary side converter 12, and a secondary side 18 having a secondary side converter 14. Primary side converter 12 comprises a full bridge converter having switch devices $S_1$-$S_4$. Secondary side converter 18 comprises a full bridge converter having switch devices $S_5$-$S_8$. It will be appreciated by those skilled in the art that, if the system 10 is operated as a bidirectional system, then the operation of the primary side 16 and secondary side 18 will be interchanged if power is supplied $V_{DC,S}$ to $V_{DC,P}$. $V_{DC,P}$ and $V_{DC,S}$ represent the dc bus voltages on the primary side 16 and the secondary side 18, respectively. $L_P$ and $L_S$ are self-inductances of the primary and secondary coils, in series with respective compensation capacitors $C_P$ and $C_S$. M is the mutual inductance between the primary and secondary coils.

Two kinds of fundamental harmonic circuit models are shown in FIGS. 1 (b) and (c), where $R_P$ and $R_S$ are the equivalent-series resistors (ESRs) of primary and secondary side coils. The difference between the two circuits is how to describe the secondary converter and the dc bus during forward power flow: using either an ac equivalent load impedance $Z_{Leq,S}$; or a sinusoidal voltage source $\dot{V}_S$. Using equivalent load impedance $Z_{Leq,S}$ is common in unidirectional systems while $\dot{V}_S$ is often used in bidirectional systems.

In this specification, the equivalent impedance modelling method is used to analyse bidirectional systems based on two reasons. The first reason is that the equivalent load impedance provides a direct way to show how the secondary converter changes the impedance characteristics of the whole system, which means it is easier to analyse the tuning condition and optimal efficiency condition. The second reason is that in practice, the secondary converter is easier to be synchronized with the secondary current rather than the primary converter. Accordingly, the equivalent load impedance is used to determine the values of four variables that correspond to the optimal operation of the WPT system. A two-step approach is adopted to determine the conditions for optimal operation of the WPT system. Firstly, the optimum load impedance (resistance) that maximizes the efficiency of the ac-ac conversion stage of the system is determined. Then the optimal voltages, relative phase angle and frequency of the converters that minimize the converter losses at the optimal load impedance in Step 1 are determined to maximize the overall system efficiency, as described below in detail.

The analysis and control strategy based on the phase of the secondary current is more suitable for implementation. Therefore, during forward power flow, the secondary converter and its dc bus are modelled as an equivalent load impedance $Z_{Leq,S}$. Conversely, the primary converter and its dc bus are modelled as an equivalent load impedance $Z_{Leq,P}$ during reverse power flow. Due to the symmetry of the system, the forward power flow case is the focus of the analysis below.

Based on Kirchhoff's voltage law, the circuit model in FIG. 1 (b) can be expressed as:

$$\dot{V}_P = Z_P \dot{I}_P + j\omega M \dot{I}_S \qquad (1)$$

$$0 = j\omega M \dot{I}_P + Z_S \dot{I}_S + Z_{Leq,S} \dot{I}_S \qquad (2)$$

where impedances $Z_P$ and $Z_S$ of the primary and secondary resonant network, respectively, are given by:

$$Z_P = j\omega L_P + (j\omega C_P)^{-1} + R_P = jX_P + R_P \qquad (3)$$

$$Z_S = j\omega L_S + (j\omega C_S)^{-1} + R_S = jX_S + R_S \qquad (4)$$

where $X_P$ and $X_S$ represent the reactance of resonant network. The equivalent load impedance $Z_{Leq,S}$ is expressed by:

$$Z_{Leq,S} = R_{Leq,S} + jX_{Leq,S} \qquad (5)$$

From (1) and (2), the input power and output power can be represented by:

$$P_{in} = \text{Re}\left[\dot{V}_P \cdot (\dot{I}_P)^*\right] = V_P^2 N_{PR}/W_P \qquad (6)$$

$$P_{out} = \text{Re}\left[\dot{I}_S \cdot (\dot{I}_S)^* \cdot R_{Leq,S}\right] = V_P^2 \omega^2 M^2 R_{Leq,S}/W_P \qquad (7)$$

Where $$\begin{cases} N_{PR} = \omega^2 M^2 (R_S + R_{Leq,S}) + R_P\left[(R_S + R_{Leq,S})^2 + (X_S + X_{Leq,S})^2\right] \\ W_P = (X_P^2 + R_P^2)\left[(R_S + R_{Leq,S})^2 + (X_S + X_{Leq,S})^2\right] + \\ 2\omega^2 M^2 (-X_P X_S + R_P R_{Leq,S} + R_P R_S + \omega^2 M^2/2) \end{cases}$$

Define the total reactance in the secondary side as:

$$X_{ST} = X_S + X_{Leq,S} \qquad (8)$$

By considering the ratio of output to input power, the efficiency of the equivalent circuit is given by:

$$\eta = \frac{P_{out}}{P_{in}} \qquad (9)$$

$$= \frac{\omega^2 M^2 R_{Leq,S}}{\omega^2 M^2 (R_S + R_{Leq,S}) + R_P\left[(R_S + R_{Leq,S})^2 + X_{ST}^2\right]}$$

As evident in (9), $X_{ST}$ is only in the denominator, which should be eliminated for optimal system efficiency. In addition, when $X_{ST}$ equals 0, an optimal equivalent load resistor $R_{Leq,S}$ can be found to achieve the optimal efficiency point by setting the derivative of $\eta$ with respect to $R_{Leq,S}$ to zero. The optimal value of $R_{Leq,S}$ is given by:

$$R_{Leq,S}^{opt}\Big|_{X_{ST}=0} = \sqrt{\frac{R_S}{R_P}(\omega^2 M^2 + R_P R_S)} \qquad (10)$$

Based on the symmetry of the bidirectional system, the optimal value of $R_{Leq,P}$ is given by:

$$R_{Leq,P}^{opt}\Big|_{X_{ST}=0} = \sqrt{\frac{R_P}{R_S}(\omega^2 M^2 + R_P R_S)} \quad (11)$$

Usually, $\omega^2 M^2$ is much larger than $R_P R_S$. Thus, for symmetric charging coils ($R_P = R_S$), $R_{Leq,S}^{opt}$ ($R_{Leq,P}^{opt}$) can be approximately simplified as $\omega M$.

In general, neglecting the operation modes of converters, the optimal condition in the equivalent circuit should be:
1) $X_{ST}$ is zero;
2) $R_{Leq,S}$ ($R_{Leq,P}$) is equal to $R_{Leq,S}^{opt}$ ($R_{Leq,P}^{opt}$).

The analysis above shows the ideal optimal condition for an equivalent circuit without converters. The operation of full bridge converters is now introduced to track the optimal efficiency condition and to control the output power against the variation of inductance, while maintaining optimal operation of the converters. It should be noted that the optimal efficiency condition is mainly dependent on the secondary impedance during forward power flow. Meanwhile, the output power is influenced by almost all the system parameters.

Therefore, we now discuss the tracking of the optimal efficiency condition, using the most relevant and necessary control freedoms of the converters. We then analyse the output-power control with the other freedoms.

In the analysis below, all circuit parameters are assumed to be known, and all the control freedoms are available to show the existence of the optimal operation condition. The practical control strategy and system will be discussed further below.

Controlling the secondary converter is the most direct way to track and control the optimal equivalent load resistor $R_{Leq,S}^{opt}$. The resistive part and reactive part of $Z_{Leq,S}$ can be expressed as:

$$R_{Leq,S} = \frac{4}{\pi^2} R_{L,S} \cos^2(\theta_S)(1 - \cos(\beta)) \quad (12)$$

$$X_{Leq,S} = \frac{4}{\pi^2} R_{L,S} \sin(\theta_S) \cos(\theta_S)(1 - \cos(\beta)) \quad (13)$$

where $\beta$ is the duty-cycle of the secondary converter and $\theta_S$ is defined as the relative phase angle between $v_S$ and $-i_S$ as shown in FIG. 3 (b), where $v_{S,1}$ is the fundamental harmonic of $v_S$. $R_{L,s}$ is a power-dependent equivalent dc resistor of the secondary dc bus expressed as:

$$R_{L,S} = \frac{V_{DC,S}^2}{P_{out}} \quad (14)$$

where $P_{out}$ is the output power of the IPT system. It is evident in (12) that both $\beta$ and $\theta_S$ can change $R_{Leq,S}$. Fixing $\theta_S$ at zero is the conventional phase-shift modulation method for full-bridge converters, as shown in the upper waveform diagrams of FIGS. 3(a) and 3(b). Actually, there are infinite combinations of $\beta$ and $\theta_S$ to achieve $R_{Leq,S}^{opt}$. But not all the combinations of $\beta$ and $\theta_S$ are optimal for the converter itself. Based on the principle of achieving zero voltage switching (ZVS) and minimizing the converter's equivalent reactance, the optimal combination of $\beta$ and $\theta_S$ can be found next.

Zero voltage switching (ZVS) comprises switching with substantially zero voltage across each switch device. To achieve ZVS of the secondary converter, the anti-parallel diode should conduct before the relevant switch (typically a MOSFET) turns on, so the actual current $-i_S$ needs to lead the voltage vs at least by $(\pi-\beta)/2$ as shown in FIG. 3 (b). Therefore, $\beta$ and $\theta_S$ should satisfy the following constraint:

$$\theta_S \leq -\frac{\pi - \beta}{2} \quad (15)$$

Because the duty-cycle $\beta$ is between [0, $\pi$], the range of $\theta_S$ should be $[-\pi/2, 0]$. In order to reduce the reactance $X_{Leq,S}$, $|\theta_S|$ should be as small as possible, and the optimal combination of $\beta$ and $\theta_S$ should satisfy the following condition:

$$\theta_S = -\frac{\pi - \beta}{2} \quad (16)$$

Considering that enough time is needed to discharge the output capacitances of the switches (e.g. MOSFETs) during the ZVS process, $|\theta_S|$ should be greater than, (in practice slightly larger than), the value in (16) in practical switch driving signals.

Substituting (16) into (12) and (13), the expression of $R_{Leq,S}$ and $X_{Leq,S}$ under the optimal operation condition of the secondary converter are given as:

$$R_{Leq,S} = \frac{4}{\pi^2} R_{L,S} \cos^2\left(\frac{\pi - \beta}{2}\right)(1 - \cos\beta) \quad (17)$$

$$X_{Leq,S} = -\frac{4}{\pi^2} R_{L,S} \sin\left(\frac{\pi - \beta}{2}\right) \cos\left(\frac{\pi - \beta}{2}\right)(1 - \cos\beta) \quad (18)$$

By controlling the duty-cycle $\beta$, the optimal equivalent load resistor $R_{Leq,S}^{opt}$ can be tracked. $\beta$ for various values of M and $P_{out}$ is shown in FIG. 4, with the parameters listed in Table I. As evident in FIG. 4, $\beta$ is a monotonic function with respect to M and $P_{out}$, which is a good characteristic for control convergence.

Once $\beta$ is known, $\theta_S$ is changed according to (16) to ensure ZVS of the secondary converter.

We turn now to consideration of the optimal operating frequency. Due to the ZVS condition of the secondary converter, $X_{Leq,S}$ is unavoidably introduced in (18) when the parameters M or $P_{out}$ vary, and $\beta$ is not equal to $\pi$. Moreover, coil misalignment causes variations in self-inductance $L_S$, leading to variation of the reactance $X_S$. As a result, the total secondary-side reactance

TABLE I

Circuit parameters for theoretical analysis and experiments

| Symbol | Parameter | Value | Unit |
| --- | --- | --- | --- |
| $V_{DC,P}$ | primary dc bus voltage | 200 | V |
| $V_{DC,S}$ | secondary dc bus voltage | 200 | V |
| $P_{out}$ | output power range | [200, 1000] | W |
| $R_{L,S}$ | secondary equivalent dc resistor | [40, 200] | Ω |
| $L_P$ | self-inductance of primary coil | [192.3, 183.5] | μH |

TABLE I-continued

Circuit parameters for theoretical analysis and experiments

| Symbol | Parameter | Value | Unit |
| --- | --- | --- | --- |
| $L_S$ | self-inductance of secondary coil | [191.8, 181.7] | µH |
| $C_P$ | primary compensation capacitor | 19.545 | nF |
| $C_S$ | secondary compensation capacitor | 19.4 | nF |
| $R_P$ | ESR of primary coil | 0.3 | Ω |
| $R_S$ | ESR of secondary coil | 0.3 | Ω |
| M | mutual inductance | [60, 21] | µH |

$X_{ST}$ in (19) cannot remain zero under most coil positions and various output power scenarios.

$$X_{ST} = X_S + X_{Leq,S} = \omega L_S - \frac{1}{\omega C_S} + X_{Leq,S} \quad (19)$$

As the secondary converter has been used to track the optimal equivalent load resistor, the available and direct control freedom to eliminate $X_{ST}$ is the operating frequency ω (as described earlier in this specification). It should be noted that, although $X_S$ and $X_{Leq,S}$ both constitute reactance, they have different and independent characteristics: $X_S$ is only dependent on the passive components and ω, and is not related to the converter and the power; $X_{Leq,S}$ is introduced by the converter and is not influenced by the frequency ω.

Therefore, by varying the frequency ω, $X_S$ can be adjusted to cancel $X_{Leq,S}$, so $X_S$ and $X_{Leq,S}$ can eliminate each other:

$$X_{ST} = \omega L_S - \frac{1}{\omega C_S} + X_{Leq,S} = 0 \quad (20)$$

Figure 5:
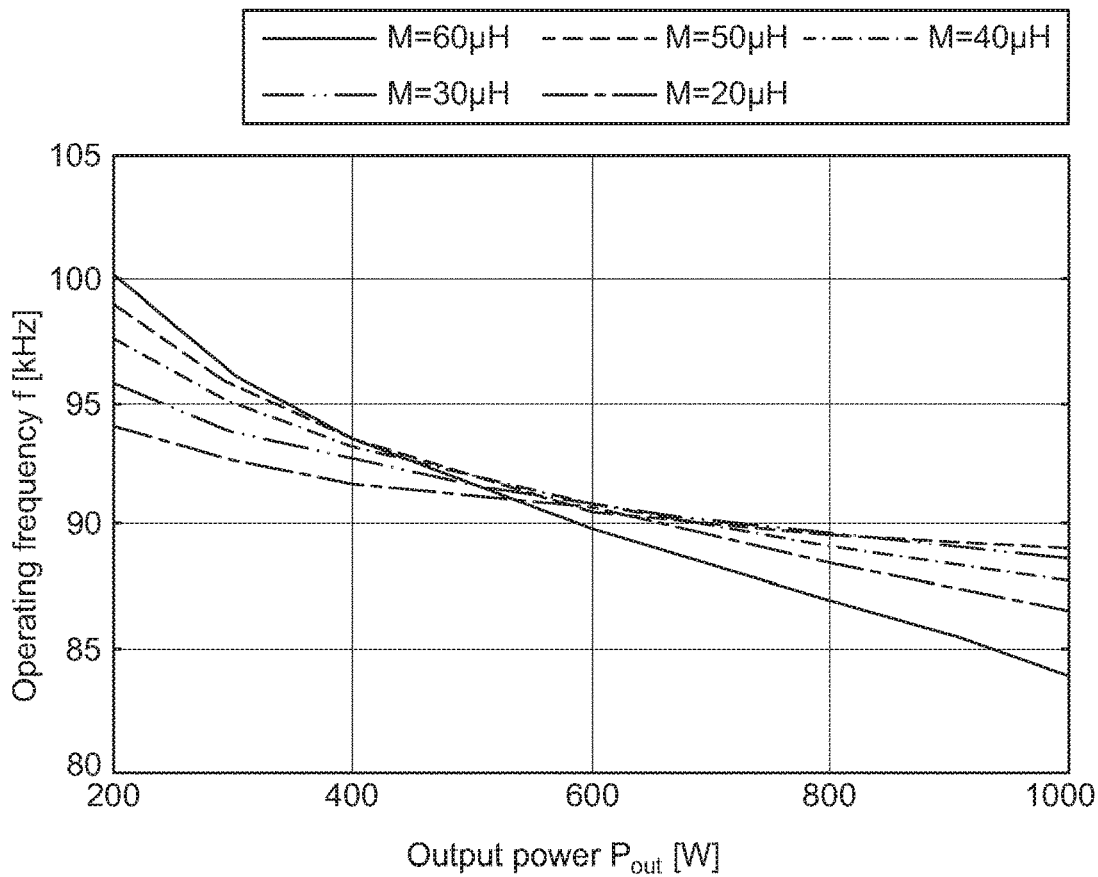
FIG. 5 is a graph of $X_{ST}$ for various M and $P_{out}$.

When the secondary converter achieves ZVS, $X_{Leq,S}$ is actually a capacitive reactance. The frequency f (ω) should be increased to generate inductive $X_S$ to eliminate the capacitive $X_{Leq,S}$. The frequency required to eliminate $X_{ST}$ for various M and $P_{out}$ is shown in FIG. 5. With the decrease of output power, $R_{Leq,S}$ increases and β has to be decreased to achieve the same $R_{Leq,S}^{opt}$ for the same M, resulting in increased $X_{Leq,S}$ and increased frequency.

We now turn to verification of primary converter's operation condition. With the optimal combination of β, $θ_S$, and ω, the secondary side circuit has achieved the optimal efficiency condition as discussed above, and the secondary converter also operates under ZVS condition. The the last goal is now to control the output power using the primary converter.

Once the secondary circuit achieves the optimal efficiency condition, the secondary-side total impedance is just equal to $ωM+R_P$. Thus, the gain of the system is known with for a given mutual inductance M. We must now find the appropriate ac input voltage for a required output power and check that the primary converter is operating under ZVS conditions.

According to (7), the output power is proportional to the square of $V_P$. $V_P$ is produced by the primary converter and can be expressed by:

$$V_P = \frac{2\sqrt{2}}{\pi} \sin\left(\frac{\alpha}{2}\right) V_{DC,P} \quad (21)$$

where α is the duty-cycle of the primary converter.

Figure 6:
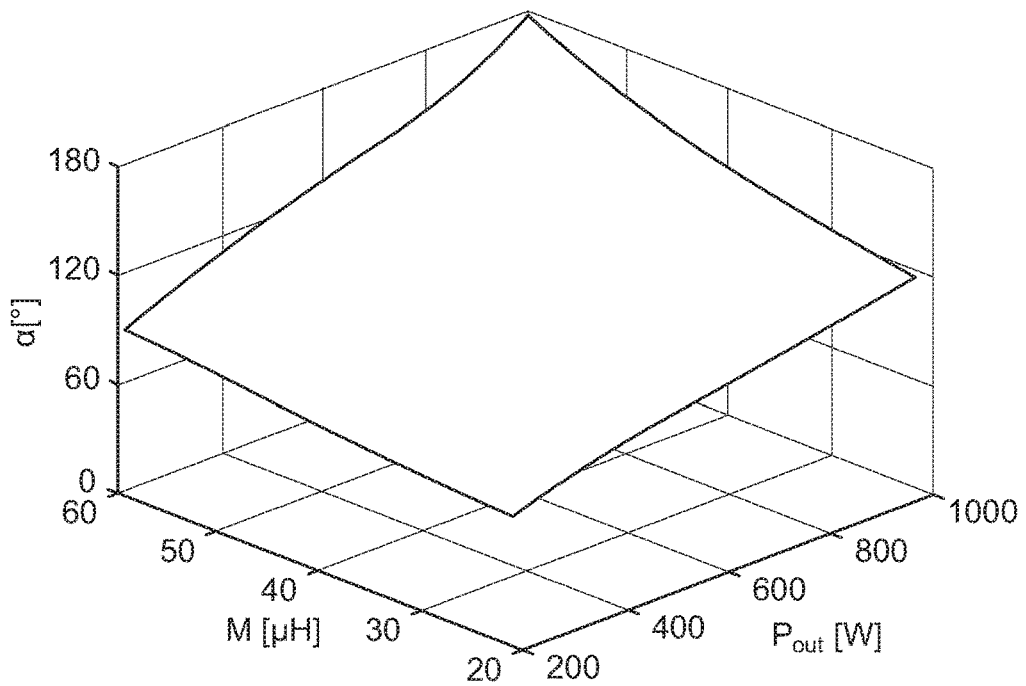
FIG. 6 is a graph of α for various M and $P_{out}$.

Substituting (21) into (7), a for a required $P_{out}$ and a given M can be solved and is shown in FIG. 6. α is also a monotonic function with respect to M and $P_{out}$. Moreover, for a certain M and $P_{out}$, α and β are close in magnitude to each other, as can be seen by comparing FIG. 6 with FIG. 4. In order to achieve a ZVS condition for the primary converter, the primary current $i_P$ must lag behind the voltage $v_P$ at least by $(π-α)/2$, as shown in FIG. 3 (*a*). Therefore, the minimum impedance angle $θ_{PZVS}$ for a ZVS condition should satisfy:

$$θ_{PZVS} = \frac{\pi - \alpha}{2} \quad (22)$$

The total impedance $Z_{PT}$ seen from the primary converter is the sum of the primary-side self-impedance and the reflected impedance from the secondary side, which can be expressed by:

$$Z_{PT} = Z_P + Z_{PR} \quad (23)$$

$$= R_P + \frac{\omega^2 M^2}{\omega M + R_S} + j\left(\omega L_P - \frac{1}{\omega C_P}\right)$$

Then the actual primary converter's impedance angle $θ_P$ is given by:

$$\theta_P = \arctan\left(\frac{\omega L_P - \dfrac{1}{\omega C_P}}{R_P + \dfrac{\omega^2 M^2}{\omega M + R_S}}\right) \quad (24)$$

Figure 7:
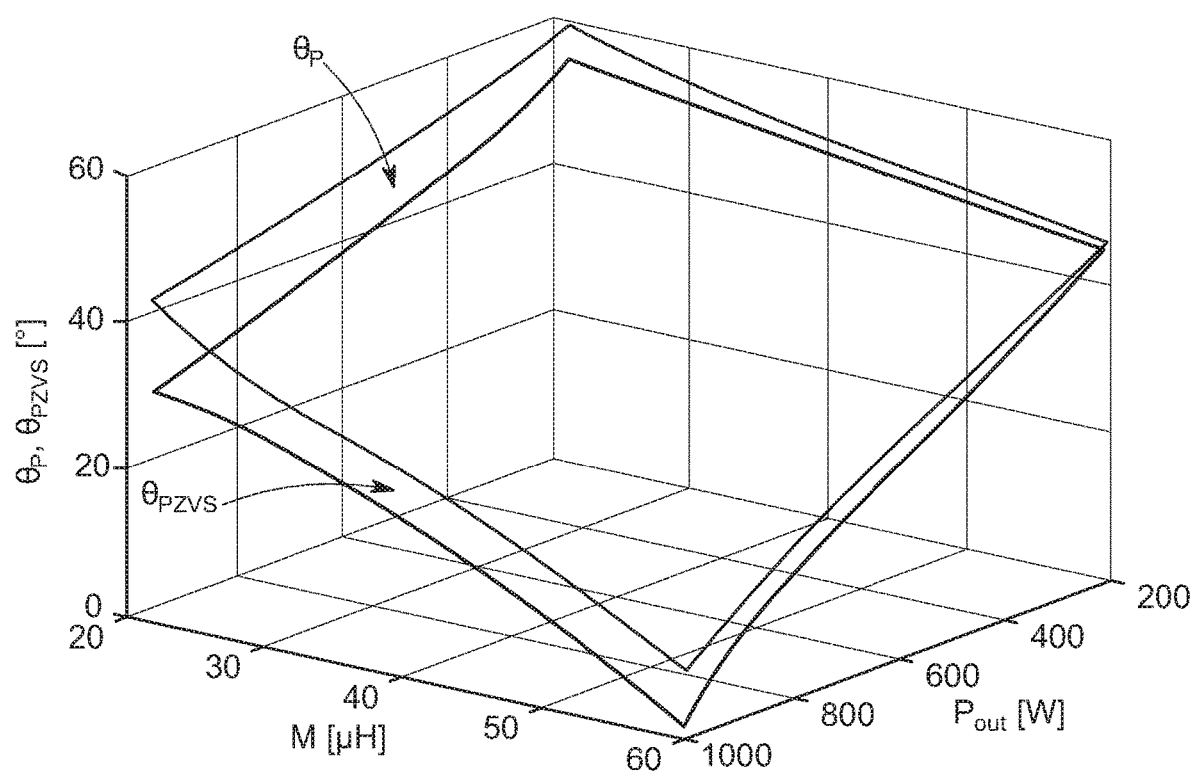
FIG. 7 is a graph of $\theta_P$ and $\theta_{PZVS}$ for various M and $P_{out}$

Both the actual $θ_P$ and the minimum value $θ_{PZVS}$ for ZVS are shown in FIG. 7. Under all output powers and values of M, $θ_P$ is slightly larger than $θ_{PZVS}$, which ensures that the primary converter can achieve ZVS all the time. Therefore, the primary converter also operates at the optimal condition to control the output power.

Turning now to the control method and system, from the analysis above, the relationship between the control freedoms of the converters and the control goals is clear.

There are four control freedoms:
1) the duty-cycle β of the secondary converter;
2) the relative phase angle $θ_S$ between $v_S$ and $i_S$; (related to the relative phase angle between $v_P$ and $v_S$)
3) the operating frequency ω;
4) the duty-cycle a of the primary converter.

The control goals are listed below:
1) To regulate the output power.
2) To track the optimal equivalent load resistor.
3) To eliminate the reactance in the secondary side.
4) To achieve ZVS in primary and secondary converters.

Some control methods are now discussed by way of example. The skilled reader will understand that the control methods can be implemented using a variety of physical apparatus, including a microprocessor executing an instruction set according to the description below. The controller may include a single or multiple physical or virtual modules and where applicable can include communication links that may be wired or wireless.

Figure 8:
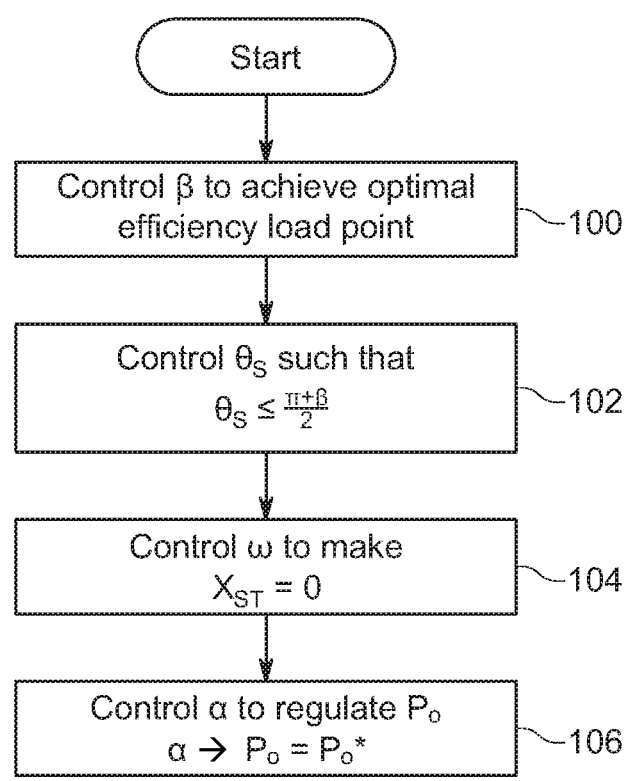
FIG. 8 is a flow chart for a control method.

The first control method can be described with reference to FIGS. 8 8A as will now be described. Some reference numerals for steps of the method are also indicated in FIG.

Figure 8A:
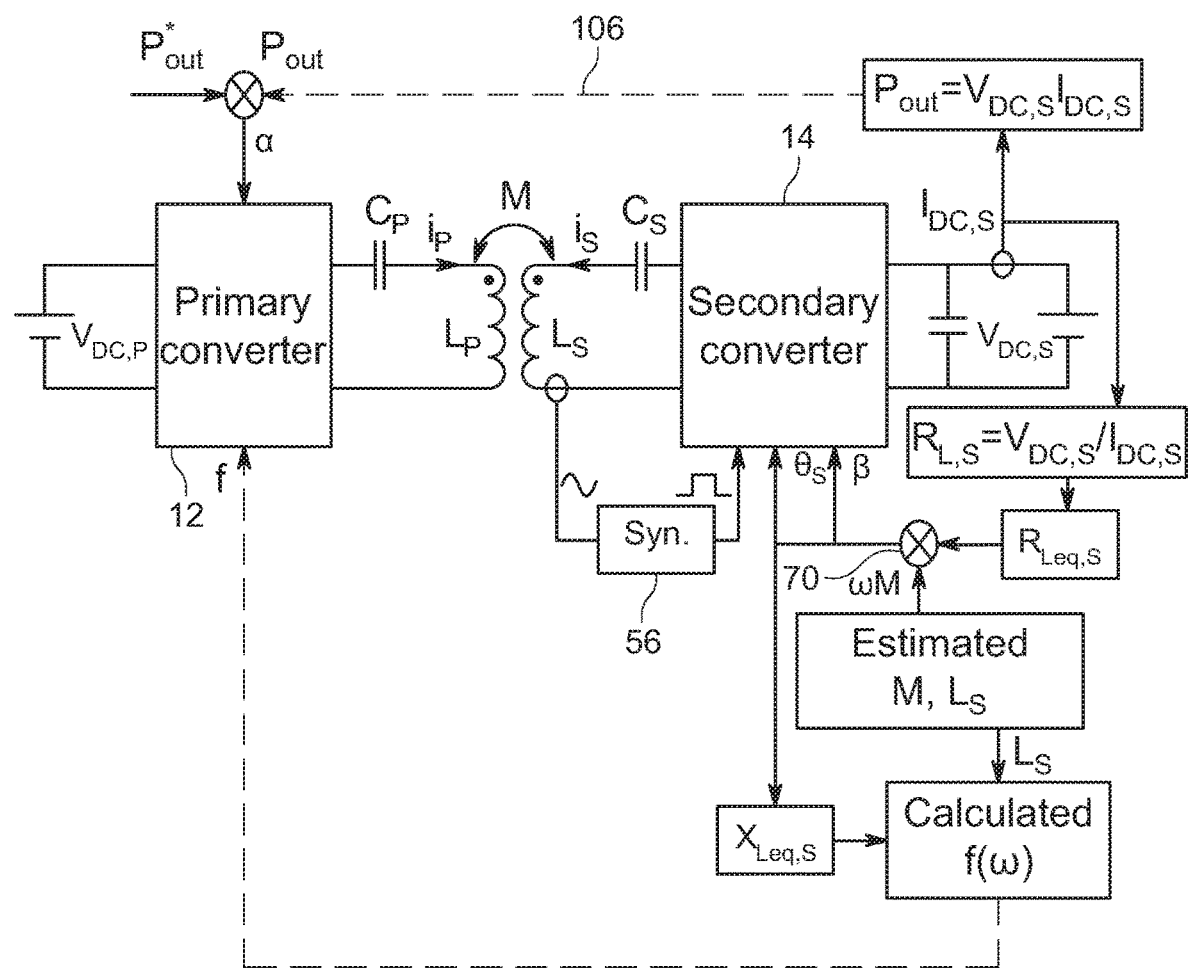
FIG. 8A is a control block diagram for the control method and system of FIG. 8.

8A to clarify the interrelationship between the control method and the system as exemplified in the block diagram of FIG. 8A. Firstly, in step 100 β is adjusted in order to control $R_{Leq,S}$ (as per equation (17)) to equal ωM. This is indicated at summing point 70 in FIG. 8A. The mutual inductance information M can be determined using the impedances at three different frequencies or using the input impedance and a look up table that contains the relationship between power output and M, or at least estimated by measuring the primary resonant current $I_P$, secondary resonant current $I_S$, and the secondary converter voltage $V_S$. Because the induced voltage in the secondary side is equal to $\omega M I_P$, the secondary-side voltage relationship can be described as $\omega M I_P = Z_S i_S + v_S$, according to Kirchhoff's voltage law. Now using two different values of $I_P$, $I_S$, and $V_S$, the mutual inductance can be estimated according to this equation. This will achieve the optimal efficiency load condition on the secondary side. Secondly, in step 102, $\theta_S$ is adjusted or controlled, as per equation (16), to ensure ZVS of the secondary converter. Thirdly, in step 104, the operating frequency f (ω) is adjusted or controlled as per equation (20). This will make the total secondary side reactance $X_{ST}$ equal zero. Fourthly and finally, in step 106 the actual output power $P_{out}$ is measured or determined and a is adjusted until the actual output power is at the required level or value, in order to regulate the output power. This first control method requires mutual inductance information (such as an estimate of M using for example measurements of $I_p$, $I_s$ and $V_s$ as described above). This first method also requires some communication from one side to the other (for example a wireless communication link), and can easily be incorporated into the communication system that exists in common in EV charging systems.

Based on the basic control concepts disclosed herein, some indirect and simpler control methods can be found.

Figure 9A:
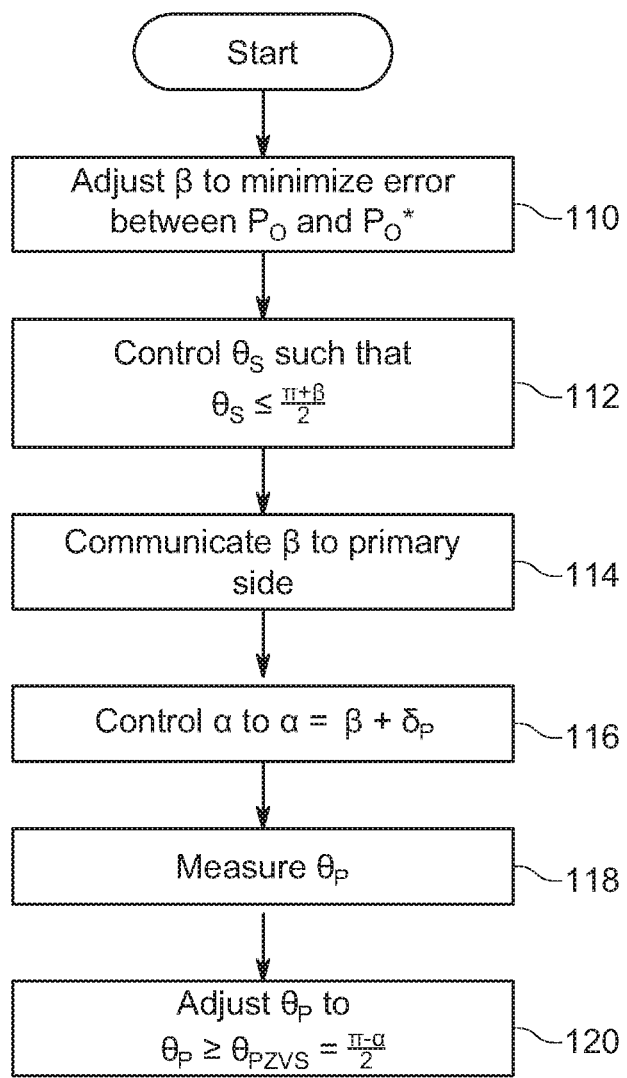
FIG. 9A is a flow chart for the control method and system of FIG. 9.
Figure 9:
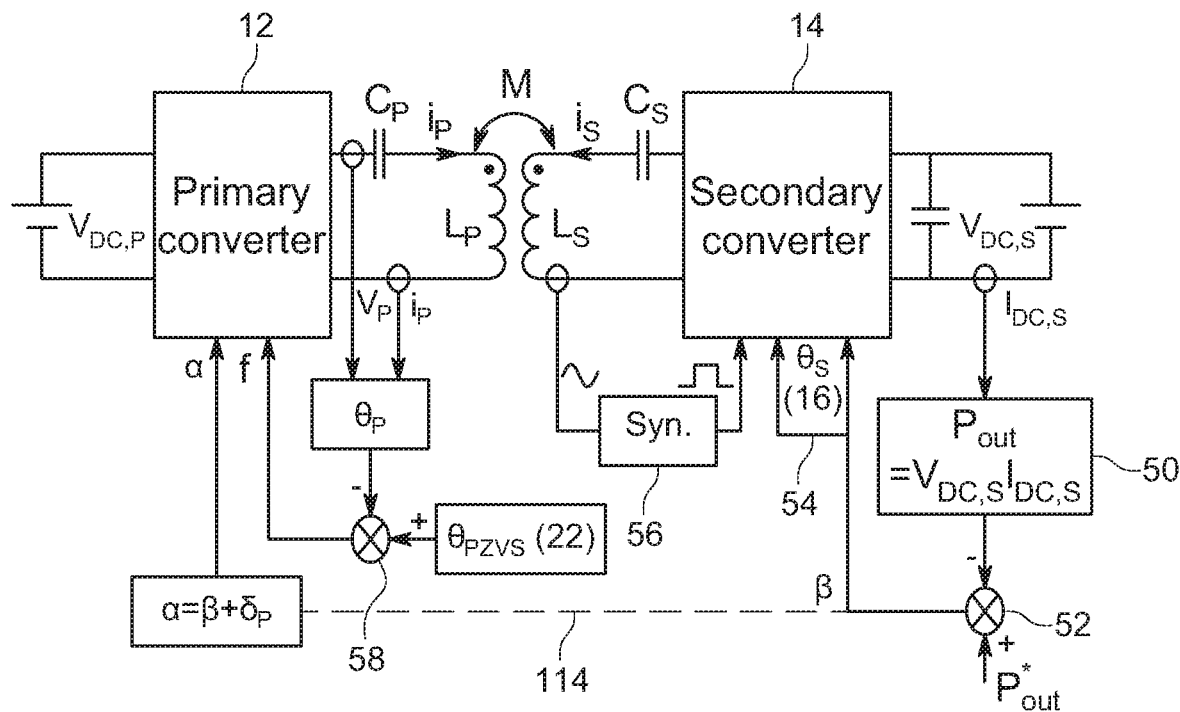
FIG. 9 is a control block diagram for another control method and system.

A second control method still involves a communication link between the primary and secondary sides, but is simpler than the first method. This method is a symmetrical control method. As described above, parameters α, $\theta_P$ on the primary side and β, $\theta_s$ on the secondary side are symmetrical for the optimal operation condition despite the variation of M and $P_{out}$. Utilizing this characteristic, a symmetrical control system and associated method is proposed as illustrated in FIGS. 9 and 9A. In order to avoid having to estimate M, the output power is regulated in step 110 by adjusting the secondary converter's duty-cycle β according to the error between the actual output power and the reference value for the required power. This is also shown in FIG. 9 with calculation of $P_{out}$ being performed at 50, and at summing point 52. Then at step 112 in FIG. 9A and at 54 in FIG. 9, $\theta_S$ is changed or adjusted to provide the ZVS condition for the secondary converter based on equation (16). A synchronisation signal for switching is provided by module 56. Then at 114 the value for β is communicated to the primary side, and at 116 the value for α is set to that of β plus $\delta_P$, where $\delta_P$ is a correction term to increase the input power considering the power losses in both sides. In some examples $\delta_P$ can be a function of β or the primary current $I_P$, which indicates the power level. Finally, $\theta_P$ is measured at 118, and the operating frequency is adjusted in step 120 to make $\theta_P$ equal to or larger than the minimum $\theta_{PZVS}$ in equation (22), and as shown by summing point 58 in FIG. 9. This method is suitable for the symmetrical BD-IPT systems that have the same or substantially the same dc bus voltage in both the primary and secondary sides. Although a communication link is needed in this method, it is acceptable for stationary charging scenarios where the mutual inductance and the power level are fixed or vary slowly.

Figure 10:
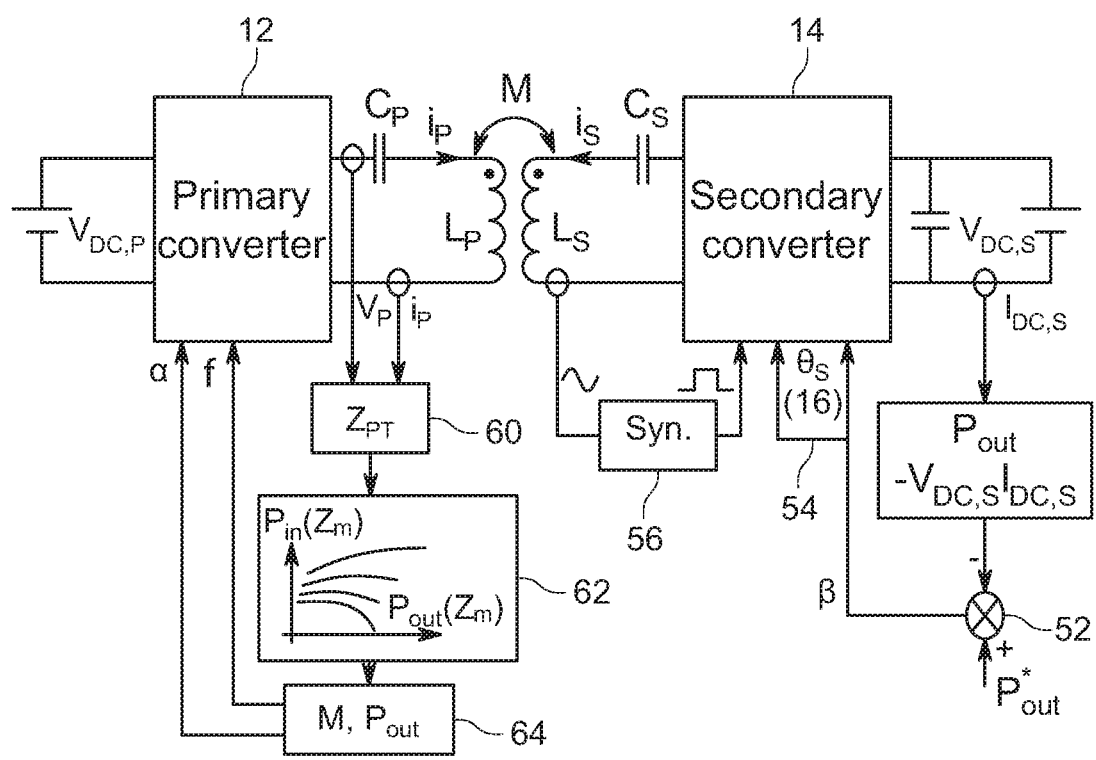
FIG. 10 is a control block diagram for another control method and system.
Figure 11:
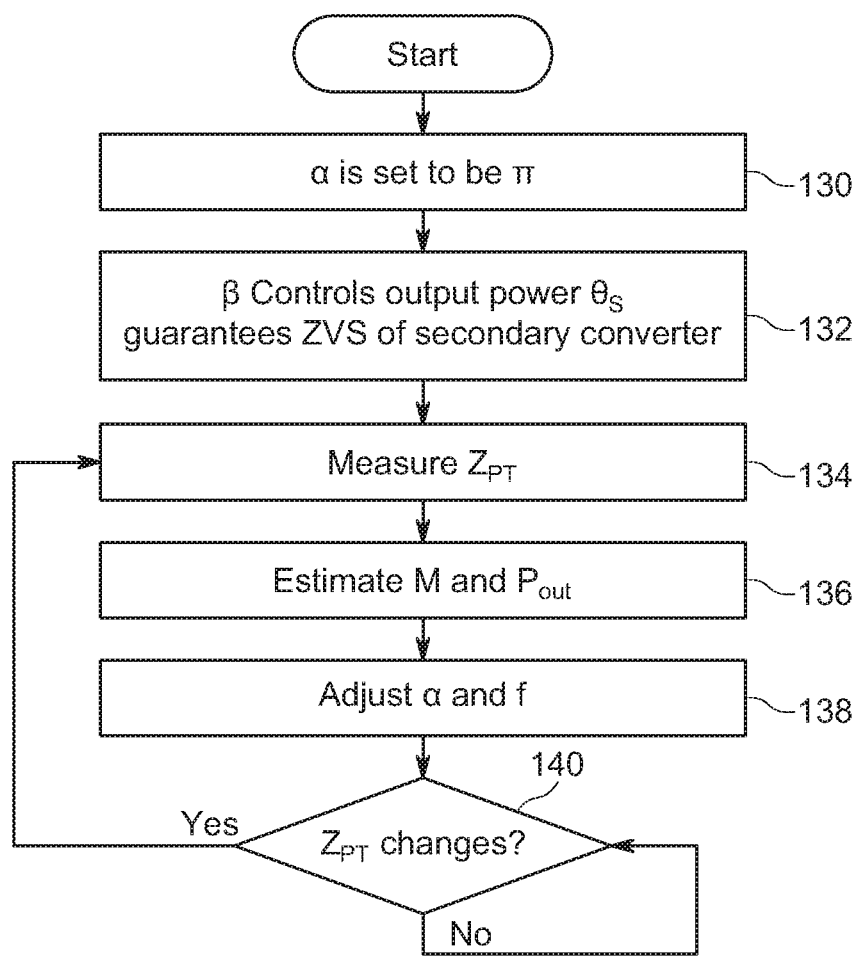
FIG. 11 is a flow chart for the control method and system of FIG. 10.

A third control method is now described in which a communication link between the primary and secondary sides is not required. This indirect control method is shown in FIGS. 10 and 11. Instead of using the feedback information from the secondary side, the primary converter operates independently based on the measured primary-side impedance $Z_{PT}$. Features of FIG. 10 that have the same reference numerals as those of FIG. 9 have the same or similar functions described in the FIG. 9 example.

Figure 12:
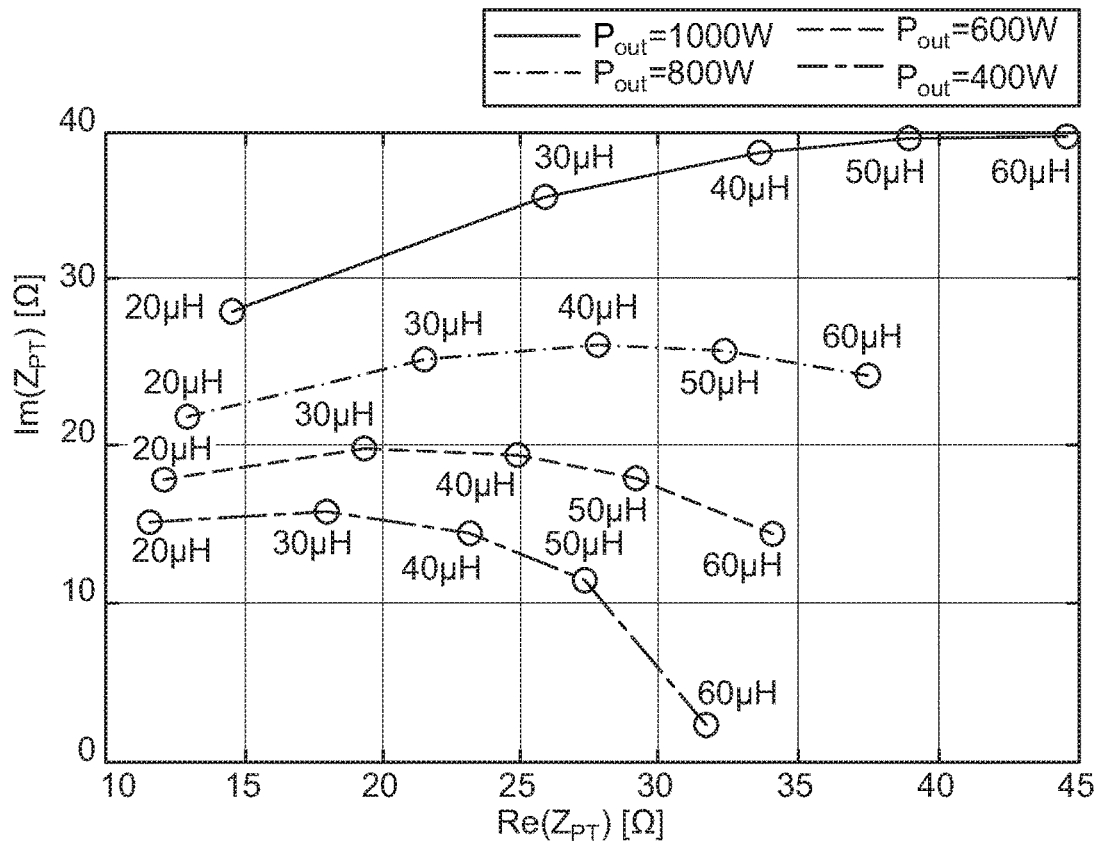
FIG. 12 is a graph of $Z_{PT}$ in the primary side showing it has unique value under each combination of M and $P_{out}$

The control flow chart of this third method is shown in FIG. 11. Firstly, in step 130 the primary converter operates with full duty-cycle at the default frequency, e.g. 85 kHz. Meanwhile, in the secondary side, the duty-cycle β is changed in step 132 to regulate the output power, and $\theta_S$ is adjusted to provide the ZVS condition of the secondary converter based on equation (16). Then, the total impedance $Z_{PT}$ seen from the primary side is measured in step 134 as shown by module 60. For various M and $P_{out}$, β and $\theta_S$ are also varied, leading to the variation of $R_{Leq,S}$ and $X_{Leq,S}$. As a result, $Z_{PT}$ in the primary side has unique value under each combination of M and $P_{out}$ as shown in FIG. 12, which is also reproduced at 62 in FIG. 10 for clarity. The real part and imaginary part of $Z_{PT}$, serving as two axes, can form a map or look-up table that indicates M and $P_{out}$. According to the measured $Z_{PT}$ and the impedance map, the primary side can estimate M and $P_{out}$ directly as indicated in step 136 in FIG. 11 and at module 64 in FIG. 10. Finally, α and f are adjusted according to FIG. 5 and FIG. 6 respectively to achieve the optimal condition for the estimated M and $P_{out}$ in step 138. If a change in $Z_{PT}$ is detected in step 140 then steps 134 to 138 are repeated.

Parameter matching for rated power will now be described. As shown in FIG. 4 and FIG. 6, the increase of both output power and mutual inductance corresponds to larger α and β. But the upper limit of α and β is π. In order to satisfy the optimal operation condition under the whole load variation range and coil misalignment range, the dc bus voltage and the rated power should match the maximum mutual inductance. The point is to ensure the optimal α and β should be less than π under the maximum mutual inductance and rated power. When β equals to π and $\theta_S$ is zero, the maximum $R_{Leq,S}$ under rated power can be expressed by:

$$R_{Leq,Smax} = \frac{8}{\pi^2} R_{L,S} = \frac{8}{\pi^2} \frac{V_{DC,S}^2}{P_{out,rated}} \qquad (30)$$

Therefore, the dc-bus voltage $V_{DC,S}$, the rated output power $P_{out,rated}$, and the maximum mutual inductance $M_{max}$ should satisfy:

$$R_{Leq,Smax} = \frac{8}{\pi^2} \frac{V_{DC,S}^2}{P_{out,rated}} \geq \sqrt{\frac{R_S}{R_P}(\omega^2 M_{max}^2 + R_P R_S)} \approx \omega M \qquad (31)$$

For a practical system, parameters should be designed specifically to satisfy (31) for matching required power/voltage rating and maximum mutual inductance. For example, in one example, the maximum mutual inductance is 60 µH, corresponding to ωM=32Ω at 85 kHz. The dc-bus voltage is designed at 200V for 1 kW rated output power. So the equivalent dc resistor $R_{L,S}$ is 40Ω and $R_{Leq,Smax}$ is 32.4Ω, which matches $\omega M_{max}$.

Figure 13:
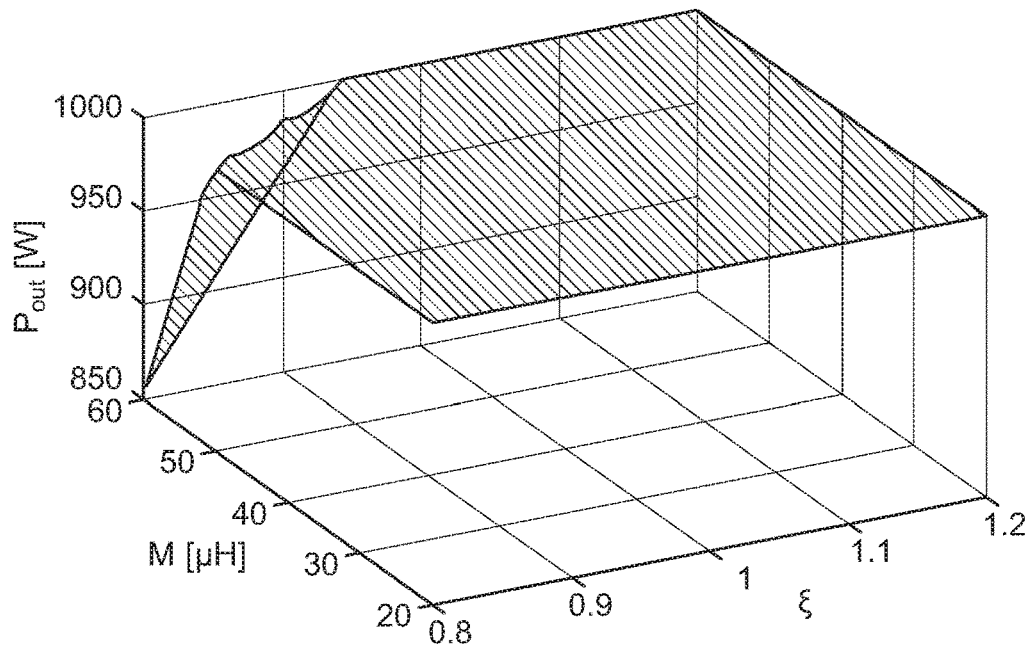
FIG. 13 is a graph of output power against M with various dc voltage ratios ξ.
Figure 14:
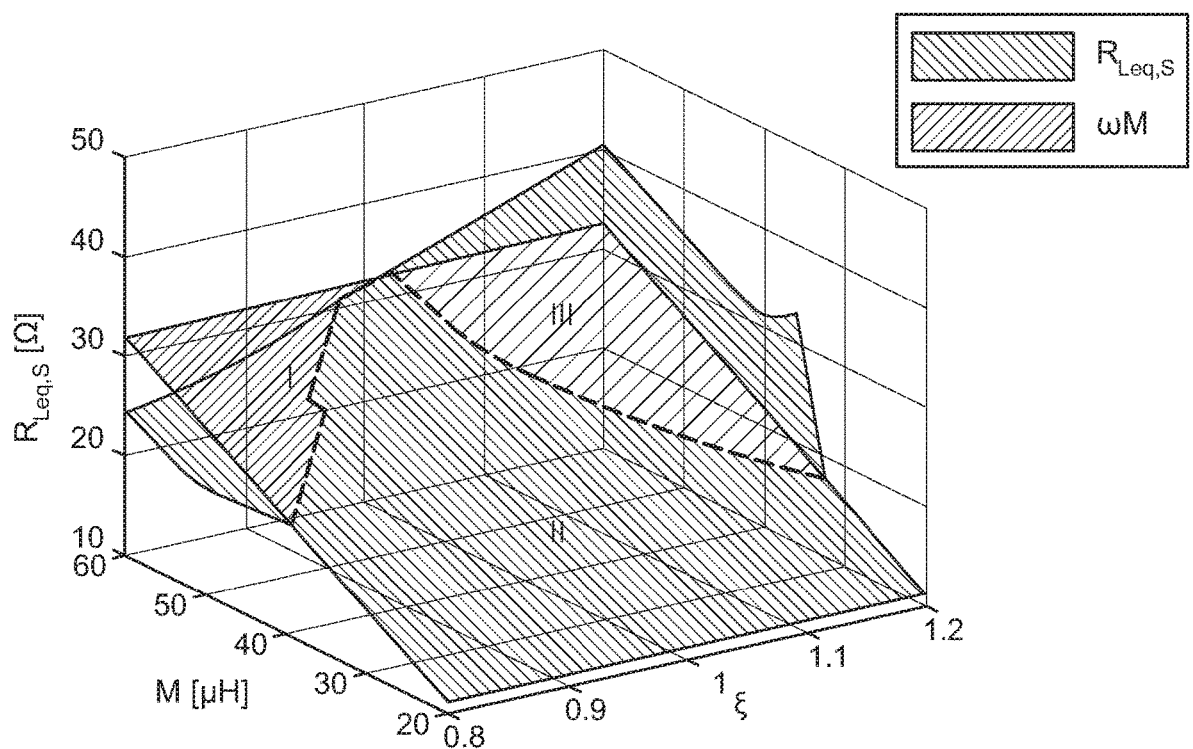
FIG. 14 is a graph of $R_{Leq,S}$ and $X_{Leq,S}$ against M with various dc voltage ratios ξ.
Figure 15:
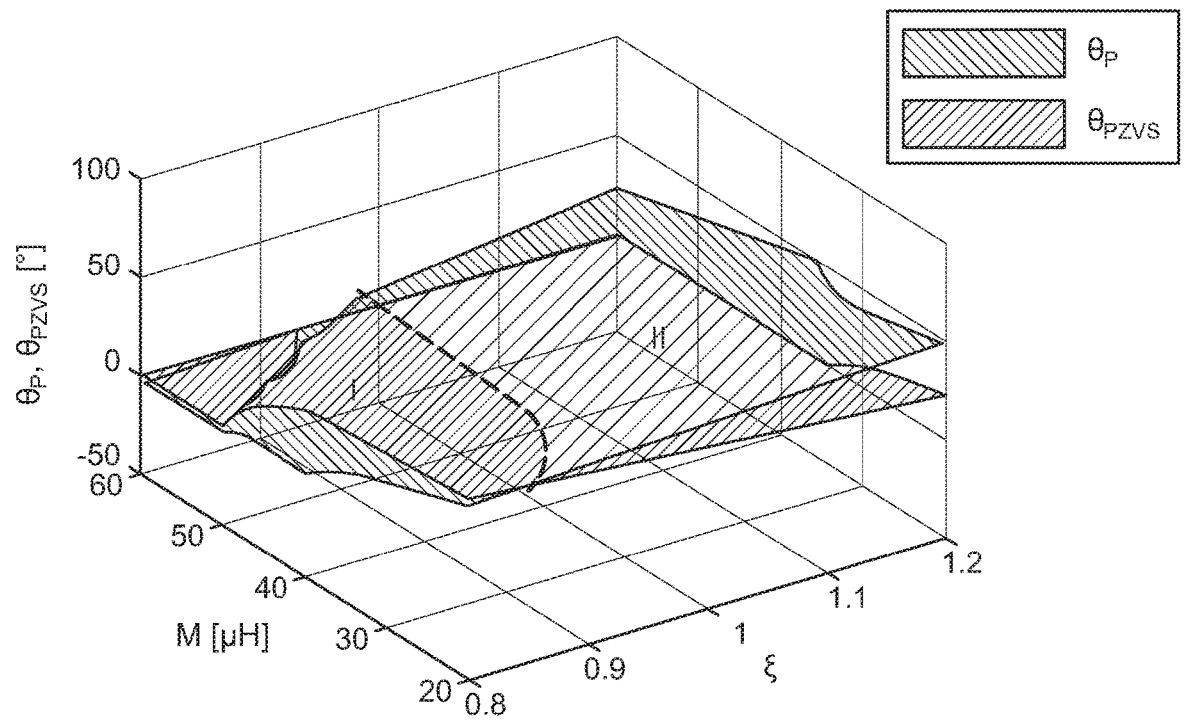
FIG. 15 is a graph of $\theta_P$ and $\theta_{PZVS}$ against M with various dc voltage ratios ξ.
Figure 16A:
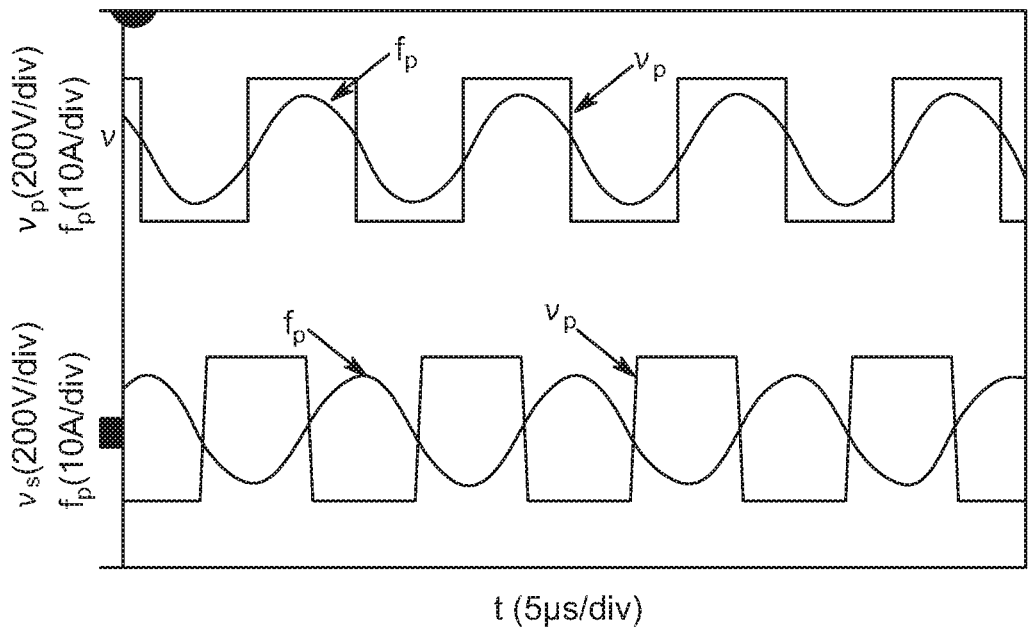
FIGS. 16A, 16B, 16C, 16D, 16E, and 16F show the steady-state waveforms of the primary converter voltage $v_P$, the primary resonant current $i_P$, the secondary converter voltage $v_S$, and the secondary resonant current $i_S$ for various M and power levels.
Figure 16B:
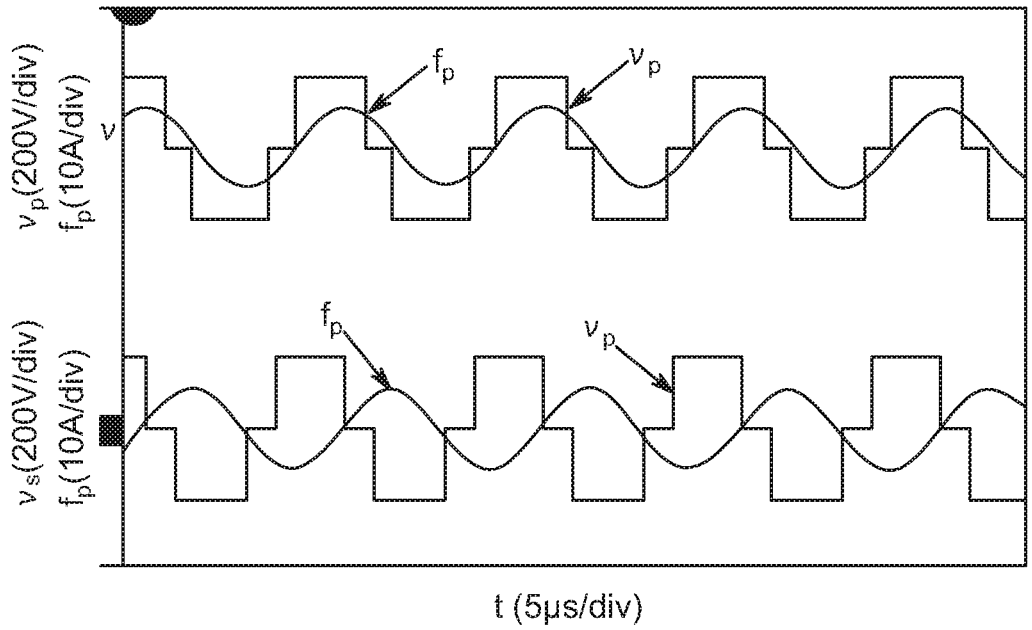
Figure 16C:
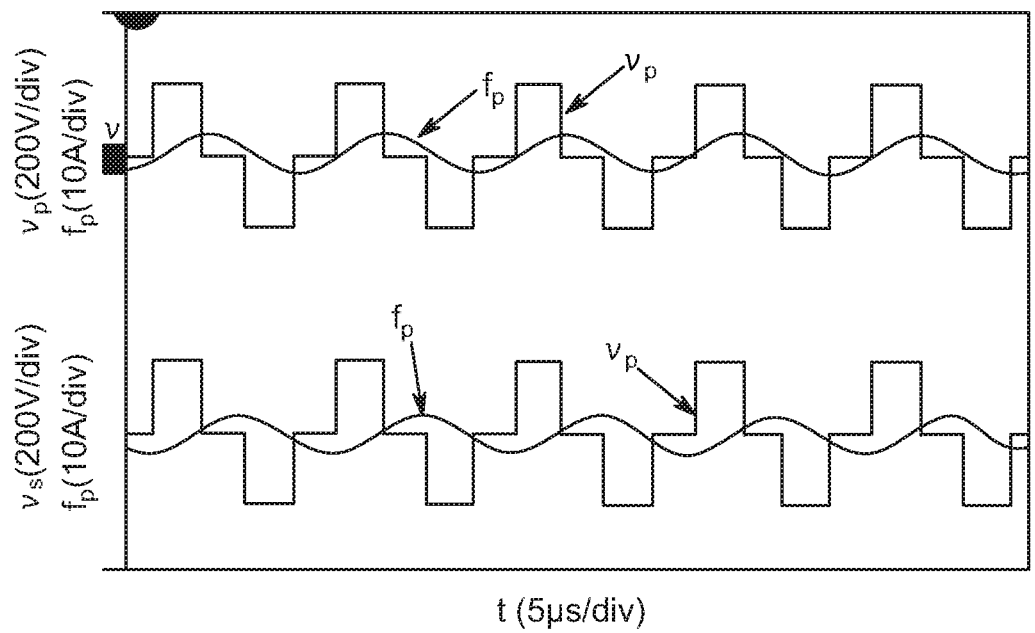
Figure 16D:
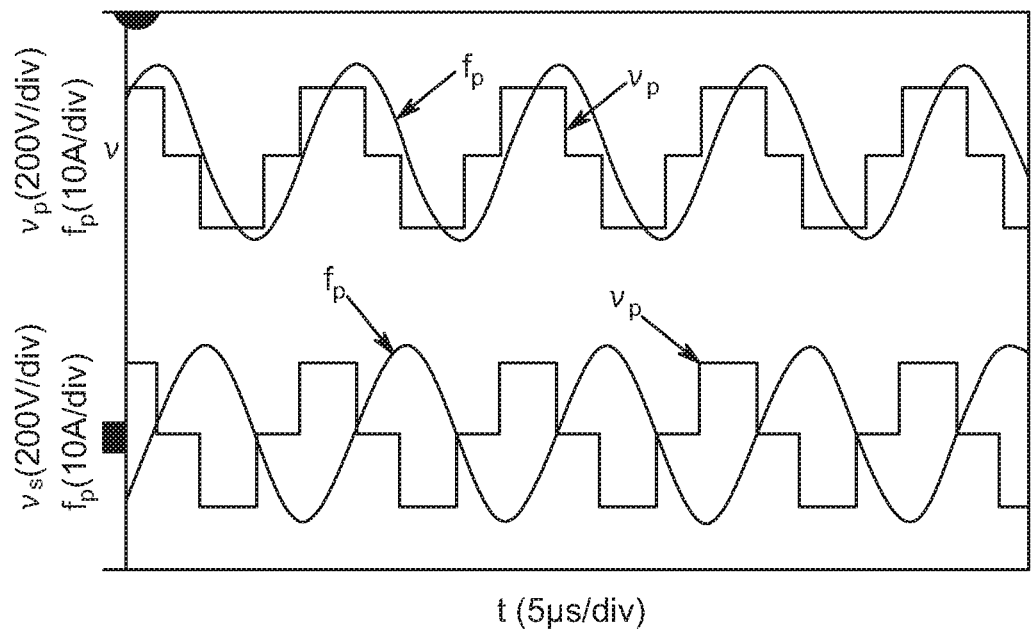
Figure 16E:
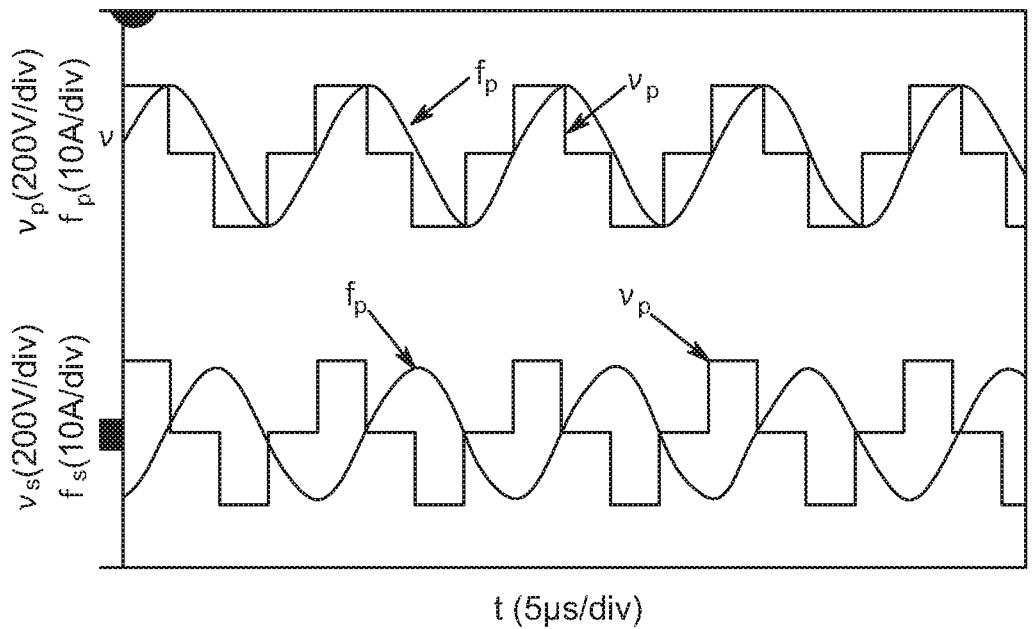
Figure 16F:
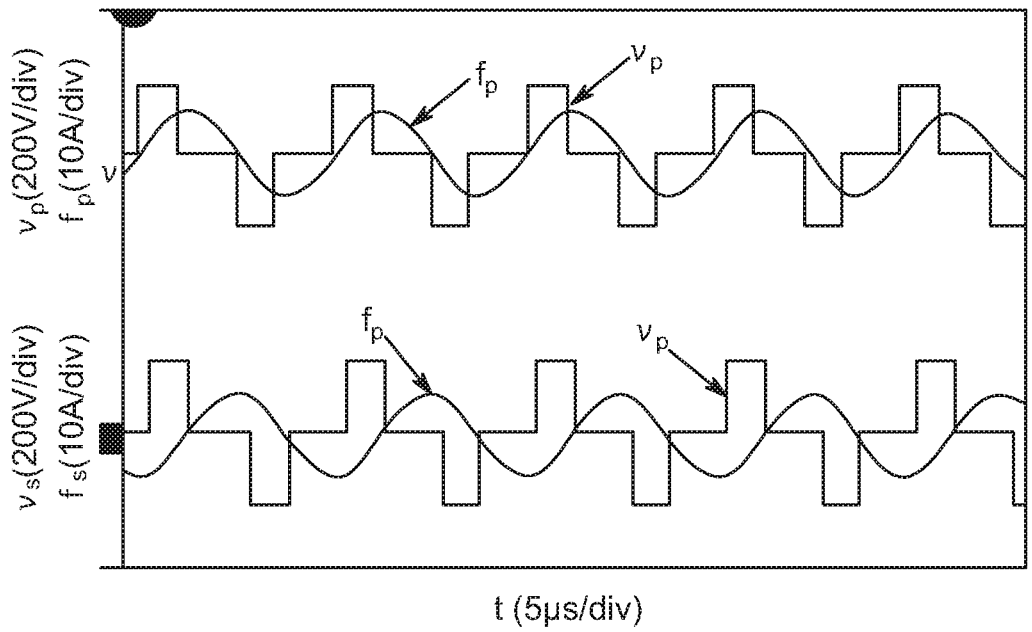

The above analyses have been disclosed on the basis of using equal bus voltages on both sides. However, this may not necessarily be the case in practice, as is shown below the control methodologies disclosed herein are valid in a variety of situations where the bus voltages are not equal. To investigate the influence of dc bus voltage of both the primary and secondary sides, its impact on the output power, the equivalent resistance of the secondary converter, and the ZVS condition of the primary converter are computed, as shown in FIG. 13, FIG. 14 and FIG. 15 respectively. The rated output power is set to 1 kW, and the primary side bus voltage $V_{DC,P}$ is kept constant at 200V while varying the secondary side bus voltage $V_{DC,S}$ from 160V to 240V, corresponding to a dc voltage ratio $\xi=V_{DC,S}/V_{DC,P}$ that ranges from 0.8 to 1.2. The four variables are varied to satisfy as many control goals as possible. The angle $\theta_S$ is changed according to (15), and the frequency is adjusted to eliminate $X_{ST}$ in all situations. If both the rated power and optimal $R_{Leq,S}$ cannot be satisfied simultaneously, $\alpha$ and $\beta$ are adjusted to satisfy the rated output power first while minimizing the difference between $R_{Leq,S}$ and its optimal value.

As evident in FIG. 13 when $\xi<0.9$, the rated output power cannot be delivered under large mutual inductances (M>50 µH) even with $\alpha=\beta=\pi$ because the output power is directly proportional to $V_{DC,S}$ but inversely proportional to M. However, in other situations, the rated output power can always be delivered.

FIG. 14 illustrates three regions; namely Region I where $R_{Leq,S}<\omega M$, Region II where $R_{Leq,S}=\omega M$, and Region III where $R_{Leq,S}>\omega M$. The difference between $R_{Leq,S}$ and $\omega M$ is an indication of the closeness of the system to the optimal ac-ac operation. Accordingly, only Region II satisfies the optimal ac-ac operation, and therefore can be considered as the desirable region of operation. In contrast, the system cannot be operated under the optimal condition in both Region I and III and incurs higher losses, depending on the difference between $R_{Leq,S}$ and $\omega M$.

FIG. 15 shows the variation of both $\theta_P$ and $\theta_{PZVS}$ against M and $\xi$, and indicates that ZVS operation of the primary converter mainly depends on the dc voltage ratio and not on the mutual inductance. When $\xi<1$, $\theta_P<\theta_{PZVS}$ and as a result the primary converter cannot achieve ZVS operation in Region I. However when $\xi\geq1$, the difference between $\theta_P$ and $\theta_{PZVS}$ increases with $\xi$ and enables the operation of the primary side converter with ZVS. Accordingly, a system that is designed with $\xi\geq1$ is preferable.

The proposed methods control all four variables $\alpha$, $\beta$, $\theta_S$ and $\omega$ simultaneously to completely eliminate the total reactance on the secondary side, and operates both converters with ZVS to further maximize efficiency when regulating power.

An experimental prototype for 1 kW rated power was built to validate the proposed method and to compare with TPS and DPS methods. The mutual inductance range is between 21 µH and 60 µH, corresponding to the coupling coefficient range from 0.115 to 0.312. All the circuit parameters are listed in Table I. The steady-state waveforms of the primary converter voltage $v_P$, the primary resonant current $i_P$, the secondary converter voltage vs, and the secondary resonant current $i_S$ are shown in FIG. 16 for various M and power level. For each row of these figures, the output power varies with the same M. With the decrease of output power, the duty-cycles $\alpha$ and $\beta$ decrease gradually to reduce power while the phases $\theta_P$ and $\theta_S$ increase gradually to achieve ZVS condition. For each column of these figures, the power is the same but M decreases from 60 µH to 21 µH. In order to maintain the rated power, $\alpha$ and $\beta$ have to be decreased with smaller M due to larger currents. Moreover, irrespective of various M and Pout, it is observable that the primary and secondary currents $i_P$ and $i_S$ are balanced, and means the system works in the optimal efficiency condition.

Figure 17:
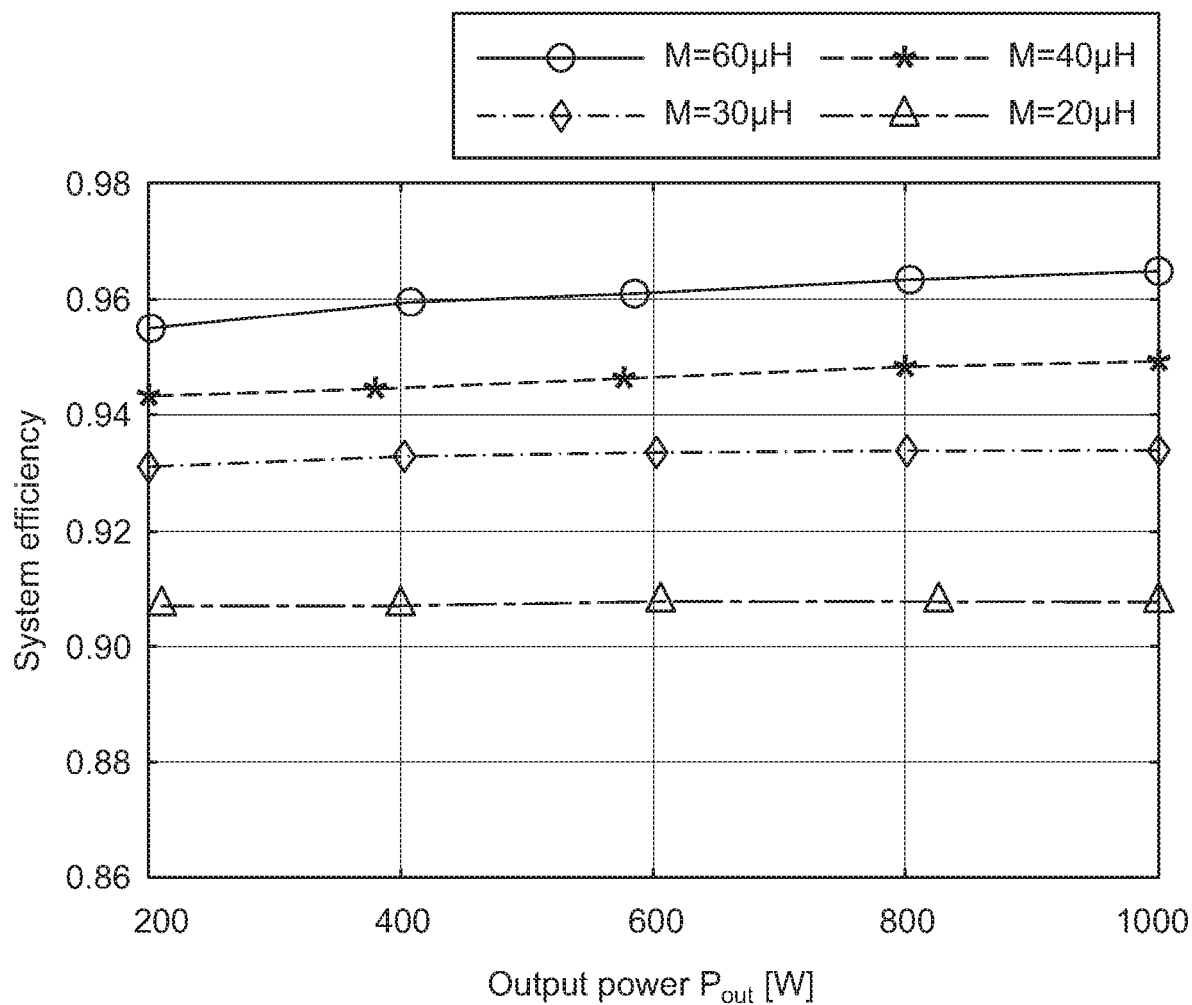
FIG. 17 is a graph showing the system efficiency with the proposed method under various M and $P_{out}$ for the first control method.

The system efficiency with the proposed method under various M and $P_{out}$ is shown in FIG. 17. Because both the optimal conditions for resonant circuit and the ZVS condition for dual-side converters are guaranteed, the efficiency drop from 1 kW to 200 W is less than 1% for each M. The maximum system efficiency reaches 96.5% with the aligned coils and rated output power. Due to the decrease of M, the system efficiency drops at a reasonable rate. Even under the worst condition (M=21 µH, Pout=200 W), the system efficiency can still reach 90.6%. Obviously, with the proposed method, the system can achieve the optimal conditions under large coil misalignment and wide power range.

Although aspects of the invention have been described with particular application to electric vehicles, those skilled in the art will appreciate that alternative fields of application comprise, for example, portable electronic devices such as cell phones, watches, tooth brushes, and the like.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Where in the foregoing description, reference has been made to specific components or integers of the invention having known equivalents, then such equivalents are herein incorporated as if individually set forth.

Note that the functional blocks, features, methods, devices, and systems described in the present disclosure may be integrated or divided into different combinations of systems, devices, and functional blocks as would be known to those skilled in the art. The order of steps in any of the methods may be altered in different implementations. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time. Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A method of controlling an inductive power transfer (IPT) primary side converter of an IPT system primary side for coupling with an IPT system secondary side having a secondary side converter, the method comprising the steps of:

measuring an impedance at the primary side to determine whether the secondary side converter is operating at a required operating condition, wherein the measured impedance includes a primary-side self-impedance and a reflected impedance from the secondary side, and wherein the required operating condition of the secondary side converter is zero voltage switching; and controlling the duty cycle of the primary side converter dependent on the measured impedance to minimize the reactance of the secondary side and to regulate the power output of the secondary side.

2. The method of claim 1 wherein minimizing the reactance of the secondary side comprises controlling the frequency of the primary converter to minimize the reactance of the secondary side.

3. The method of claim 1 further comprising:
using the measured impedance to estimate a mutual inductance between the primary side and the secondary side.

4. The method of claim 1 further comprising:
using the measured impedance to estimate the power output of the secondary side.

5. The method of claim 1 wherein the required operating condition is determined by a secondary side power output.

6. The method of claim 1 wherein the zero voltage switching includes use of a switching device or devices of the secondary side converter switching according to:

$$\theta_S \le -\frac{\pi - \beta}{2},$$

where $\theta_S$ is a relative phase angle between a voltage and current of the secondary side converter and $\beta$ is a duty-cycle of the secondary converter.

7. The method of claim 1, wherein measuring the impedance comprises:
measuring a real part and an imaginary part of the primary-side self-impedance and the reflected impedance from the secondary side.

8. The method of claim 7, further comprising:
estimating a mutual inductance between the primary side and the secondary side and estimating the power output of the secondary side from the real part and the imaginary part.

9. An inductive power transfer (IPT) primary side converter of an IPT system primary side for coupling with an IPT system secondary side having a secondary side converter, the primary side converter comprising a control apparatus configured to:
measure an impedance (Zpt) at the primary side to determine whether the secondary side converter is operating at a required operating condition, wherein the measured impedance includes a primary-side self-impedance and a reflected impedance from the secondary side, and wherein the required operating condition is zero voltage switching; and
control the duty cycle of the primary side converter dependent on the measured impedance to minimize the reactance of the secondary side and to regulate the power output of the secondary side to cause zero voltage switching operation of the secondary side converter.

10. The inductive power transfer (IPT) primary side converter of claim 9 wherein to minimize the reactance of the secondary side, the control apparatus is configured to: control the frequency of the primary converter to minimize the reactance of the secondary side.

11. The inductive power transfer (IPT) primary side converter of claim 9, wherein the control apparatus is configured to:
use the measured impedance to estimate a mutual inductance between the primary side and the secondary side, or use the measured impedance to estimate the power output of the secondary side.

12. The inductive power transfer (IPT) primary side converter of claim 9, wherein to measure the impedance, the control apparatus is configured to:
measure a real part and an imaginary part of the primary-side self-impedance and the reflected impedance from the secondary side.

13. The inductive power transfer (IPT) primary side converter of claim 12, wherein the control apparatus is configured to:
estimate the power output of the secondary side from the real part and the imaginary part.

14. The inductive power transfer (IPT) primary side converter of claim 9, wherein the required operating condition is determined by a secondary side power output.

15. A method of controlling an inductive power transfer (IPT) primary side converter of an IPT system primary side for coupling with an IPT system secondary side having a secondary side converter, the method comprising the steps of:
measuring an impedance at the primary side to determine whether the secondary side converter is operating at a required operating condition determined by a secondary side power output, wherein the measured impedance includes a primary-side self-impedance and a reflected impedance from the secondary side; and
controlling the duty cycle of the primary side converter dependent on the measured impedance to minimize the reactance of the secondary side and to regulate the power output of the secondary side.

16. The method of claim 15 wherein minimizing the reactance of the secondary side comprises controlling the frequency of the primary converter to minimize the reactance of the secondary side.

17. The method of claim 15 wherein the secondary side converter is operated at zero voltage switching.

18. The method of claim 15 further comprising:
using the measured impedance to estimate a mutual inductance between the primary side and the secondary side.

19. The method of claim 15 further comprising:
using the measured impedance to estimate the power output of the secondary side.

20. The method of claim 15, wherein measuring the impedance comprises:
measuring a real part and an imaginary part of the primary-side self-impedance and the reflected impedance from the secondary side.

21. The method of claim 20, further comprising:
estimating a mutual inductance between the primary side and the secondary side and estimating the power output of the secondary side from the real part and the imaginary part.

* * * * *